(12) United States Patent
Miyata et al.

(10) Patent No.: US 8,286,165 B2
(45) Date of Patent: Oct. 9, 2012

(54) SERVER MANAGEMENT APPARATUS AND SERVER MANAGEMENT METHOD

(75) Inventors: Yasushi Miyata, Yokohama (JP);
Tomoya Ohta, Sagamihara (JP);
Hiroyasu Nishiyama, Kawasaki (JP)

(73) Assignee: Hitachi, Ltd., Tokyo (JP)

(*) Notice: Subject to any disclaimer, the term of this patent is extended or adjusted under 35 U.S.C. 154(b) by 416 days.

(21) Appl. No.: 12/708,150

(22) Filed: Feb. 18, 2010

(65) Prior Publication Data
US 2011/0099403 A1 Apr. 28, 2011

(30) Foreign Application Priority Data
Oct. 26, 2009 (JP) ................................. 2009-245035

(51) Int. Cl.
*G06F 9/455* (2006.01)
*G06F 9/46* (2006.01)
*G06F 1/00* (2006.01)
*G06F 15/177* (2006.01)

(52) U.S. Cl. ............ 718/1; 718/104; 713/323; 713/324; 709/221

(58) Field of Classification Search ........................ None
See application file for complete search history.

(56) References Cited

U.S. PATENT DOCUMENTS
2005/0060590 A1 3/2005 Bradley et al.

OTHER PUBLICATIONS
Kusic et al., "Power and performance management of virtualized computing environments via lookahead control," *Cluster Computing*, vol. 12, pp. 1-15, 2009.

*Primary Examiner* — Camquy Truong
(74) *Attorney, Agent, or Firm* — Foley & Lardner LLP

(57) ABSTRACT

A server management apparatus for lowering migration costs during scale-in/scale-out and workload consolidation of a cluster system(s) to thereby reduce power consumption is disclosed. The apparatus manages a physical server group which renders operative a virtual server group thereon and, when putting into practice a cluster system including a plurality of virtual servers placed in the physical server group, manages the layout state of virtual servers pursuant to the load state of the virtual server group. When executing scale-in, a virtual server operating on a physical server with the minimum number of operative virtual servers is specified as a shutdown target. When executing scale-out, a workload variation is predicted to control a scale-out destination of cluster system so that load variation-resembled cluster systems gather on the same physical server. The scale-in execution timing is delayed if the predicted load variation tends to rise and accelerated if it falls.

41 Claims, 22 Drawing Sheets

| PHYSICAL SERVER | VIRTUAL SERVER GROUP | | | |
|---|---|---|---|---|
| #1 | A1 | B1 | C1 | C2 |
| #2 | A2 | B2 | C3 | |
| #3 | A3 | B3 | | |

[THIS EMBODIMENT] ⇩ SCALE-IN ⇩ [COMPARATIVE EXAMPLE]

511

| PHYSICAL SERVER | VIRTUAL SERVER GROUP | | | |
|---|---|---|---|---|
| #1 | A1 | B1 | C1 | C2 |
| #2 | A2 | B2 | C3 | |
| #3 | A3 | | | |

521

| PHYSICAL SERVER | VIRTUAL SERVER GROUP | | | |
|---|---|---|---|---|
| #1 | A1 | B1 | C1 | C2 |
| #2 | A2 | — | C3 | |
| #3 | A3 | B3 | | |

| PHYSICAL SERVER | VIRTUAL SERVER GROUP | | | |
|---|---|---|---|---|
| #1 | A1 | B1 | C1 | C2 |
| #2 | A2 | B2 | C3 | |
| #3 | A3 | B3 | | |

[THIS EMBODIMENT] ⇩ SCALE-OUT ⇩ [COMPARATIVE EXAMPLE]

531

| PHYSICAL SERVER | VIRTUAL SERVER GROUP | | | |
|---|---|---|---|---|
| #1 | A1 | B1 | C1 | C2 |
| #2 | A2 | B2 | C3 | B4 |
| #3 | A3 | B3 | | |

541

| PHYSICAL SERVER | VIRTUAL SERVER GROUP | | | |
|---|---|---|---|---|
| #1 | A1 | B1 | C1 | C2 |
| #2 | A2 | B2 | C3 | |
| #3 | A3 | B3 | B4 | |

⇩ SCALE-IN 532

| PHYSICAL SERVER | VIRTUAL SERVER GROUP | | | |
|---|---|---|---|---|
| #1 | A1 | B1 | C1 | C2 |
| #2 | A2 | B2 | C3 | B4 |
| #3 | A3 | — | | |

⇩ SCALE-IN 542

| PHYSICAL SERVER | VIRTUAL SERVER GROUP | | | |
|---|---|---|---|---|
| #1 | A1 | — | C1 | C2 |
| #2 | A2 | B2 | C3 | |
| #3 | A3 | B3 | B4 | |

⇩ SCALE-IN 533

| PHYSICAL SERVER | VIRTUAL SERVER GROUP | | | |
|---|---|---|---|---|
| #1 | A1 | B1 | C1 | C2 |
| #2 | A2 | B2 | C3 | B4 |
| #3 | — | | | |

⇩ SCALE-IN 543

| PHYSICAL SERVER | VIRTUAL SERVER GROUP | | | |
|---|---|---|---|---|
| #1 | A1 | — | C1 | C2 |
| #2 | A2 | B2 | C3 | |
| #3 | — | B3 | B4 | |

| # | | | THRESHOLD | | |
|---|---|---|---|---|---|
| 1 | OPERATION TYPE | | SCALE-IN | SCALE-OUT | LOAD CONSOLIDATION |
| 2 | JUDGING CONDITIONS | CRITERIA | and | or | |
| 3 | | CPU | <=25% | >=60% | |
| 4 | | Memory | <=25% | >=60% | |
| 5 | | FullGC | ==0 | >2 | |
| 6 | | Queue | <=25% | >=60% | |
| 7 | | Session | <=10% | >=80% | |
| 8 | | DB | <=25% | >=60% | |

FIG. 19

| # | POLICY TYPE | | THRESHOLD | | | | |
|---|---|---|---|---|---|---|---|
| | | | ACTIVE POWER SAVE | | | USABILITY KEEP | |
| 0 | OPERATION TYPE | | SCALE-IN | SCALE-OUT | LOAD CONSOLI-DATION | SCALE-IN | SCALE-OUT | LOAD CONSOLI-DATION |
| 1 | JUDGING CONDITIONS | CRITERIA | or | or | | and | or | |
| 2 | | CPU | <=25% | >=80% | | <=25% | >=60% | |
| 3 | | Memory | <=25% | >=80% | | <=25% | >=60% | |
| 4 | | FullGC | ==0 | >4 | | ==0 | >2 | |
| 5 | | Queue | <=25% | >=80% | | <=25% | >=60% | |
| 6 | | Session | <=10% | >=80% | | <=10% | >=60% | |
| 7 | | DB | <=25% | >=80% | | <=25% | >=60% | |
| 8 | MAX. VIRTUAL SERVER NUMBER | | | 5 | | | 7 | |
| 9 | MIN. PHYSICAL SERVER NUMBER | | 2 | | 2 | 3 | | 3 |
| 10 | VIRTUAL SERVER MIGRATION NUMBER | | | | <=5 | | | <=1 |

1901

FIG.22
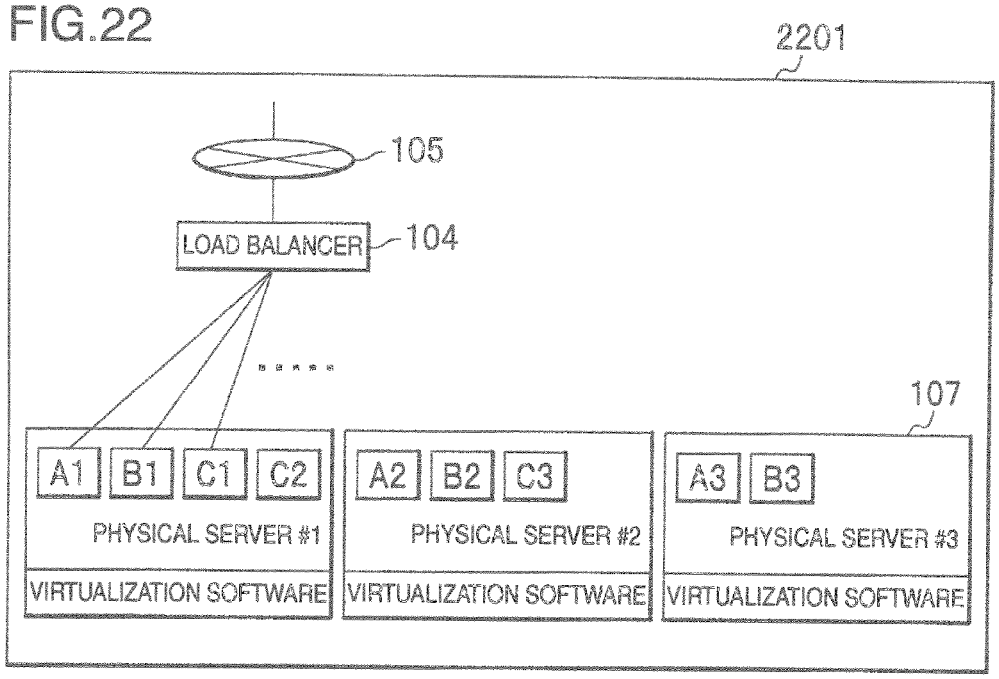
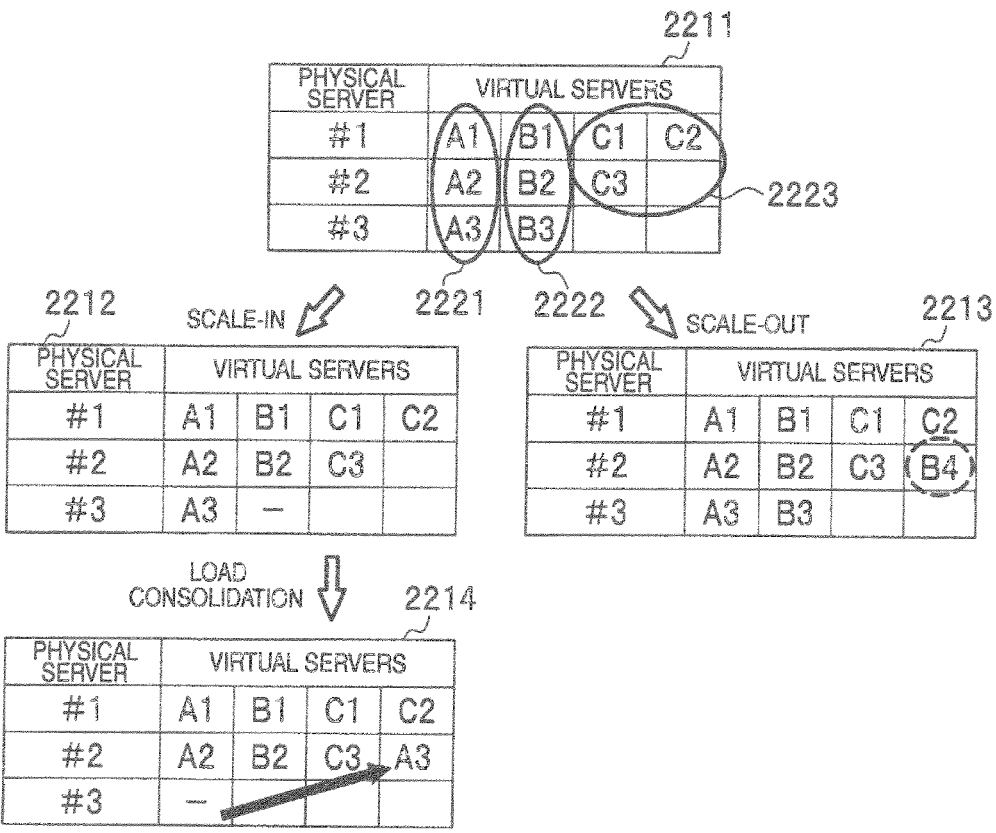

SERVER MANAGEMENT APPARATUS AND SERVER MANAGEMENT METHOD

INCORPORATION BY REFERENCE

The present application claims priority from Japanese application JP2009-245035 filed on Oct. 26, 2009, the content of which is hereby incorporated by reference into this application.

BACKGROUND OF THE INVENTION

1. Field of the Invention

The present invention relates to server virtualization technologies for allowing a single physical server to operate as one or more independent virtual servers. This invention also relates to a technique for dynamically modifying the configuration of a cluster system which is arranged by virtual servers to thereby reduce electrical power consumption.

2. Description of the Related Art

In recent years, aggressive attempts are made to promote the introduction of virtualization technology into business-entity information systems (referred to hereinafter as corporate systems), which are information systems for use in business enterprises or companies. By the virtualization technology, physical or "real" servers that constitute a corporate system are replaced by virtual servers, resulting in a decrease in physical server number owing to server integration (i.e., server consolidation). By such reduction of the physical server number, companies may obtain the merit of reduction of physical server introduction costs and power consumption.

In corporate systems, the workload can vary depending upon operation time periods and timings. In a corporate system which provides services by a cluster system that is constituted from a plurality of virtual servers, when all the virtual servers are rendered operative in a way tuned with a peak of the workload, redundant computing resources (e.g., central processing unit (CPU), memory or the like) relative to the workload consume surplus electrical power being supplied thereto, resulting in incurrence of much waste. Known approaches to reducing such surplus power include load change-sensitive dynamic system configuration alteration and workload consolidation techniques, some of which are disclosed in US Published Patent Application 2005/0060590A1 and in the article by Dara Kusic et al., entitled "Power and performance management of virtualized computing environments via lookahead control", Cluster Computing, Kluwer Academic Publishers (March 2009).

It should be noted that the cluster system as used herein is a system which is arranged to contain a plurality of virtual servers that perform the same computation processing and which has a function module (e.g., workload dispersion device, also known as load balancer) operative to dispatch and allocate requests from clients with respect to the plurality of virtual servers. The computation processing is executed by an application server, which may be a software program running on a virtual server(s).

The US 2005/0060590A1 cited above discloses therein a system which includes a plurality of physical servers each having a plurality of virtual servers operating thereon. In the subject system, a physical server with operative virtual servers is modified in a way pursuant to the workload in order to reduce power consumption (this is called the relocation or "migration" of virtual servers). More specifically, a computing resource amount required is derived through computation from a present workload state as a necessary virtual server number; then, a virtual server or servers are migrated to the minimum required physical server(s) for enabling operations of the derived number of virtual servers (this processing is herein denoted as "workload consolidation"). As a result of this, a surplus physical server with no operative virtual servers is generated. The power supply of such physical server is turned off, thereby reducing power consumption.

In the Dara Kusic et al. cited above, a system environment is disclosed, wherein a plurality of cluster systems each being configured from virtual servers are rendered operative on a plurality of physical servers. In this environment, the cluster systems are applied scale-in/scale-out processing in accordance with the workload in order to reduce power consumption.

The scale-in is a processing operation for halting the request allocation with respect to one or more than one virtual server constituting a cluster system and for deleting the virtual server from the cluster system. By this scale-in, the computing resource amount that is consumed by the cluster system is reduced. Furthermore, a physical server with the number of the in-operation virtual servers becoming zero (0) due to deactivation of the scale-in-executed virtual server is powered off, thereby reducing power consumption.

On the other hand, the scale-out is a processing operation for adding one or more virtual servers to a cluster system and for starting the request allocation to the added virtual server. The scale-out results in an increase in computing resource amount to be consumed by the cluster system. Additionally, prior to execution of the scale-out, virtual server start-up processing is performed when the need arises.

In the Dara Kusic et al., a specific level of consumed power appropriate for the number of operative virtual servers of each physical server is obtained in advance as power consumption data. Using this pre-obtained power consumption data, processing is performed for deleting from the cluster system a virtual server which is expected to offer the highest power consumption reduction effect owing to the deactivation in the scale-in event. The virtual server that was deleted from the cluster system is rendered inoperative. In the scale-out event, processing is performed for adding to the cluster system a virtual server which is lowest in rise-up of power consumption when it is activated. Prior to this adding processing, the virtual server is activated as needed.

SUMMARY OF THE INVENTION

It is considered that by combining together the techniques of the US 2005/0060590A1 and Dara Kusic et al., it is possible to optimize the cluster system's required computing resource amount in conformity with the workload, thereby achieving workload consolidation of virtual servers to the smallest possible number of physical servers. As a result, it is presumed to enable enhancement of the power consumption reducing effect. However, in order to make the power consumption reduction effect higher, a need is felt to solve several problems indicated below.

A first problem to be solved lies in the necessity to control a scale-in/scale-out target of the cluster system in such a way that the number of virtual server migration events is minimized during workload consolidation. In the system taught from US2005/0060590A1, an increase in virtual server migration number during the workload consolidation results in a decrease in power consumption reduction effect and also in occurrence of a decrease in response performance due to unwanted increases in virtual server migration costs.

Note that the virtual server migration costs are a workload of central processing unit (CPU), input/output (I/O) load, migration time, etc. increases in CPU load and I/O load result in an increase in power consumption. Additionally, an increase in migration time results in shortening of a time taken to power off a physical server, which leads to a decrease in power consumption reduction effect. Further, the increase in migration time retards execution of a load variation tracking operation, thereby making it impossible for the cluster system to offer the response performance required by users.

On the other hand, Dara Kusic et al. is silent about the workload consolidation processing; so, it does not employ a method of modifying the configuration of a cluster system in such a manner as to minimize the virtual server migration number during the workload consolidation. Due to this fact, mere combination of the techniques of US2005/0060590A1 and Dara Kusic et al. is encountered with the problem of a decrease in power consumption reduction effect due to virtual server migration costs and the problem of a decrease in response performance.

A second problem is that it is inevitable to provide control for prevention of power consumption increase caused by alternate repetition of scale-in and scale-out operations without arranging the cluster system to have extra computing resources, Dara Kusic et al. teaches that the cluster system is designed to have extra computing resources to thereby allow threshold values for use in scale-in and scale-out events to have sufficiently large margins. With this system design, alternately repeated execution of scale-in and scale-out is prevented, thereby achieving the prevention of an increase in power consumption otherwise occurring due to repeating of power supply turn-on/off of physical servers within a short period of time. However, with this method, a problem exists as to deterioration of the power consumption reducing effect, although the number of system configuration modifications by the scale-in/scale-out decreases.

The present invention has been made in order to solve the above-stated problems, and an object of the invention is to provide a server management apparatus and a server management method, which are capable of maximally reducing the migration costs in the events of scale-in/scale-out and workload consolidation of a cluster system(s)—that is, the number of system configuration modification events—to thereby reduce power consumption.

In order to solve the first problem stated supra, the following apparatus and means are provided.

(1-1) An apparatus for managing a plurality of cluster systems that become target objects to be modified in configuration by virtual server activation/deactivation (power-on/power-off) is provided, which apparatus is a server management apparatus (e.g., server management apparatus 101) for controlling the amount of computing resources to be used by a cluster system which uses a plurality of virtual servers by executing deactivation/activation processing of one or some of a plurality of virtual servers making up the cluster system and scale-in/scale-out processing to be performed in a way associated with the deactivation/activation processing. Note that although the number of such virtual servers constituting the cluster system is modifiable by the virtual server deactivation/activation processing only, it is a general approach to perform the scale-in/scale-out processing simultaneously in order to avoid a failure of request allocation with respect to the cluster system. In view of this, an explanation as will be given below is under an assumption that the virtual server deactivation processing is performed after having executed the scale-in whereas the virtual server activation processing is done prior to execution of the scale-out.

(1-2) A means for determining a virtual server which becomes a target object to be deactivated—say, deactivation target—after execution of the scale-in is provided, which includes a means (e.g., load information collection unit 124) for collecting load information of a cluster system, a means (e.g., scale-in judgment unit 131) for judging from the load information whether the scale-in is executable or not, a means (e.g., configuration information collection unit 125) for collecting configuration information of a virtual server to a physical server in a case where the scale-in is judged to be executable, and a means (e.g., scale-in target virtual server selection unit 132) for selecting, from the configuration information collected, a virtual server which exists in a physical server that is least in number of operative virtual servers therein as a deactivation target after execution of the scale-in.

(1-3) A means for selecting a physical server in which a virtual server is newly rendered operative prior to execution of the scale-out is provided, which includes a means (e.g., scale-out judgment unit 134) for judging the necessity of the scale-out from the load information that was collected by the means for collecting load information of the cluster system, and a means (e.g., scale-out target physical server selection unit 135) for selecting, when the above-noted judgment indicates that the scale-out is needed, a physical server which is largest in number of operating virtual servers from the collected configuration information.

(1-4) As an alternative to the above-stated means for selecting a physical server with a virtual server being newly activated prior to execution of the scale-out, there may be provided a means (e.g., scale-out judgment unit 134) for judging the necessity of the scale-out from the load information as collected by the means for collecting load information of the cluster system, a means (e.g., load variation similarity calculation unit 701) for determining through computation the degree of similarity of a load variation from the load information that was collected in the past, and a means (e.g., scale-out target physical server selection unit 135) for selecting a physical server in which are present a larger number of virtual servers constituting a cluster system that is high in the computed load variation similarity.

Furthermore, in order to solve the second problem stated supra, the following means are provided.

(2-1) To control the execution timing of the scale-in, there is provided a means (e.g., load variation prediction unit 1301) for determining from the load information collected in the past whether a present load is on an upward trend or on a downward trend with respect to each cluster system, for modifying, if the load is on the downward trend, a threshold value used for judgment of whether the scale-in is executable or not in such a way as to actively perform the scale-in, and for modifying, if the load is on the upward trend, the threshold used for judgment of whether the scale-in is executable or not in such a way as to negatively perform the scale-in.

(2-2) To control the execution timing of the scale-out, there are provided a means (e.g., configuration information collection unit 125) for collecting the information of a surplus computing resource amount(s) as held by a physical server(s), a means (e.g., scale-out/scale-up judgment unit 1601) for using the collected computing resource amount(s) to judge whether the scale-up of a virtual server is executable or not, a means (e.g., scale-up target server selection unit 1602) for selecting, if the judgment indicates that the scale-up is executable, a virtual server to be applied scale-up processing in place of the scale-out of the cluster system, and a means (e.g., scale-up execution unit 1603) for applying the scale-up to the selected virtual server and for controlling a load dispersion device called the "load balancer" to thereby increase the amount of requests to be processed by the virtual server so that it becomes greater than that of a virtual server(s) within the cluster system.

It is noted that the scale-up as used herein is the processing for increasing the computing resource amount of a CPU or memory to be assigned to a virtual server to thereby increase the number and speed of request processing. This computing resource uses an unused computing resource which is held by a physical server on which the scale-up executed virtual server is rendered operative.

According to this invention, it is possible to reduce the migration costs to the greatest possible extent at the time of cluster system's scale-in/scale-out or workload consolidation—i.e., the number of system configuration modifications—to thereby reduce power consumption.

Other objects, features and advantages of the invention will become apparent from the following description of the embodiments of the invention taken in conjunction with the accompanying drawings.

BRIEF DESCRIPTION OF THE DRAWINGS

FIG. 3 is a diagram showing an execution sequence of scale-in.

FIG. 5A is a diagram showing an effect example in the case of controlling a scale-in target by use of the number of virtual servers on a physical server; and FIG. 5B is a diagram showing an effect example in the case of controlling a scale-out target by the number of virtual servers on a physical server.

FIG. 19 is a diagram showing an exemplary operational policy.

FIG. 22 is a diagram showing an exemplary configuration of a cluster system at the time of scale-in/scale-out and workload consolidation to be performed by server management apparatus.

DESCRIPTION OF THE EMBODIMENTS

Figure 1:
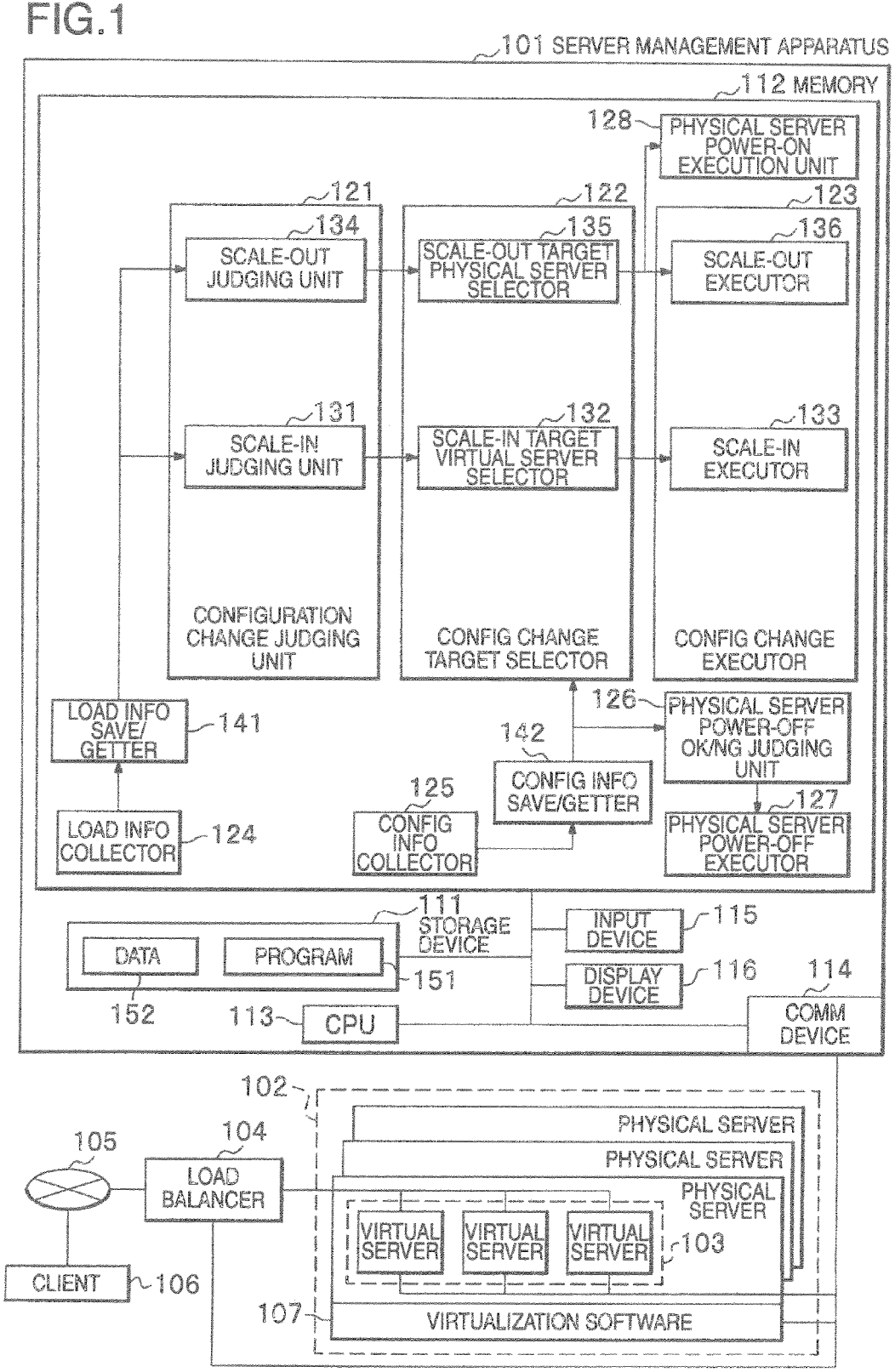
FIG. 1 is a diagram showing a cluster system in accordance with an embodiment 1 of this invention.

Embodiments of this invention will be described in detail with reference to the accompanying figures of the drawing below.

Embodiment 1

FIG. 1 is a diagram showing a cluster system in accordance with an embodiment 1. This cluster system is generally made up of a server management apparatus 101, a group of physical servers 102 which are objects to be managed and each of which has a group of virtual servers 103, and a workload dispersion device 104, also known as load balancer. The load balancer 104 is communicably connected via a network 105 to client equipment 106.

The server management apparatus 101 has its function of executing scale-in/scale-out processing, and may be realizable by using a currently available standard computer. The server management apparatus 101 includes a memory 112, a central processing unit (CPU) 113, a communications device 114, a storage device 114 such as hard disk drive (HDD) or else, an input device 115, and a display device 116. The server management apparatus 101 is coupled to the physical server group 102, virtual server group 103 and load balancer 104 via communication device 114.

The scale-in is the processing for stopping request dispatch/allocation with respect to one or more virtual servers constituting a cluster system and for deleting this virtual server from the cluster system. Execution of the scale-in makes it possible to reduce the computing resource amount to be consumed by the cluster system. Furthermore, by deactivating the scale-in-executed virtual server, the power supply of a physical server in which the number of operating virtual servers became zero (0) is turned off, thereby enabling reduction of power consumption thereof. On the other hand, the scale-out is the processing for adding one or more virtual servers to a cluster system and for starting the request allocation with respect to the added virtual server. Execution of the scale-out makes it possible to increase the computing resource amount to be consumed by the cluster system. Prior to the execution of the scale-out, virtual server activation processing is performed as the need arises.

The input device 115 is a device for entry of data and instructions, such as program start-up, etc., to a computer. This device may typically be a keyboard and/or a pointing device, called the mouse. Examples of the display device 116 include a cathode-ray tube (CRT) and a liquid crystal display (LCD) panel, for visually indicating a present execution status of the processing to be performed by the server management apparatus 101 and execution results thereof. The CPU 113 executes various kinds of software programs being stored in the memory 112. The communication device 114 transmits and receives various kinds of data and commands to and from another device via a local area network (LAN) or the like. The storage device 111 is for storing various data to be used when the server management apparatus 101 executes the processing. The memory 112 holds various programs of processing tasks to be executed by the server management apparatus 101 along with temporary data relating thereto.

The server management apparatus 101 manages a plurality of cluster systems, each of which is constituted from a load balancer 104 and a plurality of virtual servers contained in the virtual server group 103 and performs the processing of receiving a request from the client 106 via network 105. The load balancer 104 here is a device which allocates requests from client 106 to one or more virtual servers within the virtual server group 103.

Although in FIG. 1 the load balancer 104 is arranged to exist between the network 105 and physical server group 102, this device may be disposed as a virtualized device in the physical server group 102 or may be arranged by designing a virtual server within the virtual server group 103 to have similar functionality to that of the load balancer. Alternatively, the client 106 may be arranged to have similar functionality to that of the load balancer 104 and perform the request allocation processing at client 106.

The virtual server group 103 is executed on a visualization software 107 running on the physical server group 102. Any given number of servers of this virtual server group 103 are used to establish a plurality of cluster systems. The virtualization software is a software program for providing control so that a physical server's computing resource is usable by the virtual server group 103 in a divided way or in a shared manner.

The CPU 113 reads a program 151 and data 152 stored in the storage device 111 into the memory 112 and executes the program. The program 151 has a load information collection unit 124, configuration information collection unit 125, configuration change judgment unit 121, load information save/acquisition unit 141, configuration information save/acquisition unit 142, configuration change target selection unit 122, configuration change execution unit 123, physical server power-off OK/NG judgment unit 126, physical server power-off execution unit 127, and physical server power-on execution unit 128.

For example, the configuration change judgment unit 121 determines based on the acquired (collected) load information whether the number of those virtual servers constituting a cluster system is reducible or not. In addition, the configuration change judgment unit 121 judges from the collected load information collected by the load information collection unit 124 the excess or deficiency of the number of the virtual servers constituting a cluster system. The configuration change judgment unit 121 judges from the load information collected by the load information collection unit 124 the excess or deficiency of the number of virtual servers-constituting a cluster system. When it is judged that the number of the cluster system-constituting virtual servers is deficient, the configuration change target selection unit 122 selects from the configuration information collected by the configuration information collection unit 125 a physical server which is largest in number of operative virtual servers; then, the configuration change execution unit 123 activates a virtual server(s) on the selected physical server.

The load information collection unit 124 receives the load information of a virtual server group constituting a cluster system by using the communication device 114 to communicate with the virtual server group 103 and virtualization software 107. The load information save/acquisition unit 141 stores the load information collected by the load information collection unit 124 in the storage device 111 as data 152 and acquires past load information from the data 152. The configuration change judgment unit 121 determines based on the load information acquired by the load information save/acquisition unit 141 whether the cluster system's configuration modification is executable or not and also judges whether the configuration change is necessary or not.

Note that although in FIG. 1 the load information collection unit 124 and the load information save/acquisition unit 141 are shown as separate components, this is only exemplary and is not intended to assert or imply any limitation with regard to the principles of this invention. The load information collection unit 124 may be arranged to receive the load information of the cluster system-constituting virtual server group by using the communication device 114 to communicate with the virtual server group 103 and virtualization software 107 and save the collected load information in the storage device 111 as data 152 and then acquire past load information from the data 152. In this case, the configuration change judgment unit 121 determines from the load information acquired by the load information collection unit 124 whether the cluster system's configuration change is executable or not and whether the configuration change is needed or not.

The configuration information collection unit 125 collects via the communication device 114 the information indicating that the virtual server group 103 is allocated onto the virtualization software 107 to be executed by which one of the physical servers in the physical server group 102 and an unused computing resource amount to be held by such physical server as the configuration information.

The configuration information save/acquisition unit 142 stores the configuration information collected by the configuration information collection unit 125 in the storage device 111 as data 152 and acquires past configuration information from the data 152.

In case the configuration change judgment unit 121 judges that the configuration change of the cluster system is executed, the configuration change target selection unit 122 selects from the information collected by the configuration information save/acquisition unit 142 either a virtual server or a physical server which becomes a target object to be changed in configuration—i.e., configuration change target—in such a way as to make it possible to reduce the number of virtual server migration events at the time of execution of workload consolidation. The configuration change execution unit 123 executes the configuration change with respect to the configuration change target that was selected by the configuration change target selection unit 122.

The physical server power-off OK/NG judgment unit 126 determines whether it is possible to turn off the power supply of a physical server within the physical server group 102 as a result of execution of the configuration change. In case the physical server power-off OK/NG judgment unit 126 determined that it is possible to power off the physical server, the physical server power-off execution unit 127 executes power-off or shut-down of the physical server. In case it is needed to power on the physical server at the time of execution of the configuration change, the physical server power-on execution unit 128 turns on the power of it.

The configuration change judgment unit 121 has a scale-in judgment unit 131 for judging whether the scale-in is possible or not, and a scale-out judgment unit 134 for judging the necessity of scale-out. The configuration change target selection unit 122 has a scale-in target virtual server selection unit 132 for selecting a virtual server to be deactivated after execution of scale-in, and a scale-out target physical server selection unit 135 for selecting a physical server which activates a virtual server prior to execution of the scale-out. The configuration change execution unit 123 has a scale-in execution unit 133 for deactivating a virtual server which was selected by the scale-in target virtual server selection unit 132 after execution of the scale-in of cluster system, and a scale-out execution unit 136 for activating a virtual server(s) on the physical server that was selected by the scale-out target physical server selection unit 135 and for executing the scale-out processing.

For a plurality of cluster systems under management, the server management apparatus 101 selects a virtual server which is set as a deactivation target after execution of the scale-in and also a physical server in which the virtual server is newly activated prior to execution of the scale-out. An outline of the means for reducing power consumption and time taken for a configuration change, such as the virtual server's activation/deactivation or workload consolidation due to migration, also at this time will be explained with reference to FIG. 22 below.

FIG. 22 is a diagram showing a configuration example of a cluster system at the time of scale-in/scale-out or workload consolidation or both to be performed by server management apparatus. Here, an explanation will be given by taking as an example an environment in which the server management apparatus 101 administrates a cluster system A (2221), cluster system B (2222) and cluster system C (2223) as indicated in a configuration information table 2211. In FIG. 22, a correspondence relationship between cluster system-constituting virtual servers and physical servers and a relationship with the load balancer 104 are indicated by a virtual/physical server configuration 2201. The load balancer 104 allocates requests from clients for optimal distribution among the virtual servers constituting each cluster system.

In FIG. 22, the virtual/physical server configuration 2201 is shown in a configuration information table 2211 for explanation purposes. In the configuration information table 2211, physical server groups No. 1 to No. 3 which are under management of the server management apparatus 101 are shown in a physical server column thereof. In a virtual server column, virtual servers which are operating on the physical servers #1 to #3 are shown. For example, in the physical server #1, a virtual server constituting the cluster system A and a virtual server B1 constituting the cluster system B and also virtual servers C1 and C2 constituting the cluster system C are rendered operative. Regarding the plurality of cluster systems being managed by the server management apparatus 101, the cluster system A (2221) is constituted from virtual servers A1, A2 and A3. The cluster system B (2222) is configured from virtual servers B1, B2 and B3. The cluster system C (2223) is configured from virtual servers C1, C2 and C3. Note that configuration information tables 2212-2214 of FIG. 22 are each similar to the configuration information table 2211.

In a case where the cluster system B (2222) decreases in workload and the scale-in becomes possible, a virtual server or servers is/are selected from among the virtual servers B1-B3 and then deactivated. In this embodiment, by taking into consideration the fact that the workload consolidation is also performed, a virtual server(s) to be deactivated after execution of the scale-in is/are selected in such a way that the number of virtual servers to be moved or "migrated" between physical servers in the workload consolidation event becomes smaller. More specifically, the server management apparatus 101 judges that the virtual server B3 must be selected for deactivation from among the virtual servers B1-B3 constituting the cluster system B (2222) whereby the resulting environment becomes the nearest to power-off of the physical server #3. Then, a result of execution of the scale-in is shown in the configuration information table 2212.

In addition, a result of migration which causes the virtual server A3 to change from the state of the configuration information table 2212 so as to operate on the physical server #2 due to workload consolidation is shown in the configuration information table 2214. As the result of such workload consolidation, no virtual servers operating on the physical server #3 are present; thus, the physical server #3 is powered down to thereby reduce power consumption.

On the other hand, in case the workload relative to the cluster system B (2222) rises up from the state of the configuration information table 2211, scale-out is performed. In this embodiment, a physical server that becomes a scale-out destination is selected in such a way as to minimize power consumption when the intended configuration change is performed, such as scale-in or workload consolidation, after having done the scale-out. Specifically, first of all, the physical servers #2-#3 are selected, which retain unused computing resources that are usable to permit new activation of those virtual servers constituting the cluster system B (2222). Next, from the selected physical servers #2-#3, the physical server #2 which is largest in number of operative virtual servers is selected as the virtual server that becomes a scale-out target. A result of it is shown in the configuration information table 2213.

In case the scale-in is applied to the cluster system A (2221) and cluster system B (2222) after the scale-out, the virtual servers A3 and B3 are deactivated, thereby enabling power-off of the physical server #3.

In the prior art, no attempts are made to select a virtual server which becomes the scale-in target and a physical server that becomes the scale-out target by taking into consideration the process of performing workload consolidation after scale-in and the process of performing scale-in or workload consolidation after the scale-out. For this reason, the prior art is unable to reduce power consumption by executing the workload consolidation with the minimum possible number of virtual server migrations as in this embodiment. The outline that was explained using FIG. 22 will be explained in greater detail with reference to FIGS. 2 to 6 below.

Figure 2:
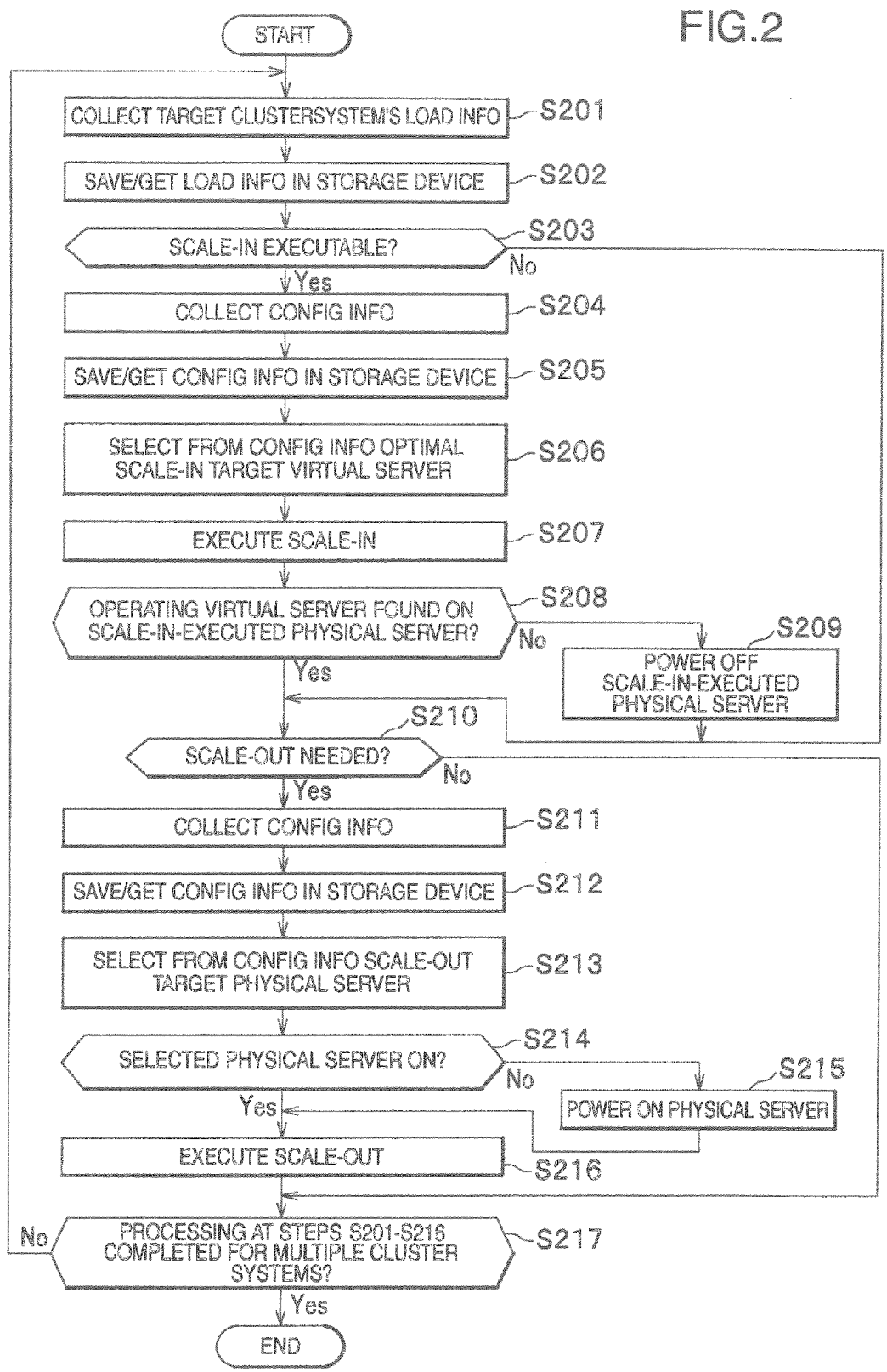
FIG. 2 is a diagram showing a flow of scale-in/scale-out processing which is executed by a server management apparatus.

FIG. 2 is a diagram showing a flow of scale-in/scale-out processing which is executed by the server management apparatus. Reference is also made to FIG. 1 as appropriate. An operation of the server management apparatus 101 will be explained in accordance with the flow diagram shown in FIG. 2. The server management apparatus 101 executes for a plurality of cluster systems the processing operations which will be indicated below. It is noted that these processing operations may be sequentially executed with respect to the plurality of cluster systems or, alternatively, may be executed simultaneously. Also note that in the ensuing description, a specific cluster system of the plurality of cluster systems in which the server management apparatus 101 is executing processing will be referred to as the target cluster system.

In the server management apparatus 101, the load information collection unit 124 collects the load information of the virtual server group 103 constituting the target cluster system via the communication device 114 (at step S201 of FIG. 2). This load information may be collected by communication with a virtual server(s) or, alternatively, may be collected by communication with the virtualization software 107 running on each physical server.

The load information that was collected by the load information collection unit 124 is stored in the storage device 111 by the load information save/acquisition unit 141 (at step S202). This load information has information owned by computing resources and an application server.

Note that the computing resources in this embodiment are CPU usage rate (CPU), memory usage rate (Memory), disk usage rate, and network band usage rate of a virtual server. The information owned by the application server is indicative of those values which increase or decrease in response to a request from client and/or an application execution time, such as for example the processing wait queue number (Queue) of an application software running on a virtual server, database connection number (DB), garbage collection occurrence frequency (FullGC), session number (Session) and so forth. Respective load information is designed so that threshold values for use as scale-in/scale-out judgment criteria, such as shown in a threshold table 601 of FIG. 6, are preset and held in the data 152 that is saved in the storage device 111.

Figure 6:
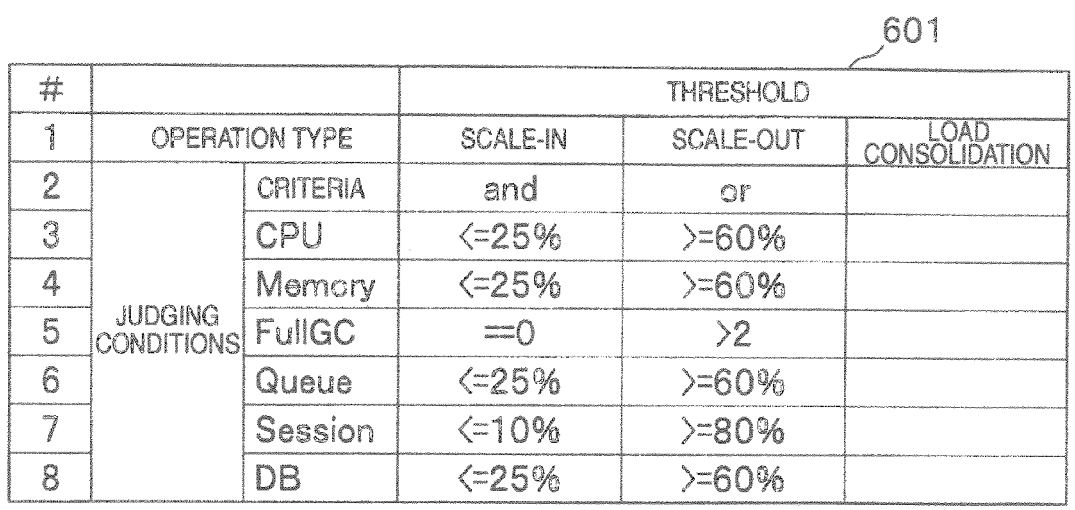
FIG. 6 is a diagram showing threshold values for use in scale-in and scale-out judgment events.

FIG. 6 is a diagram showing the threshold values for use in scale-in and scale-out judgment events. The threshold table 601 that becomes the scale-in/scale-out judgment criteria consists essentially of a column of judgment criteria and a set of threshold values, wherein the judgment criteria column consists of judgment conditions #1 to #8. The judgment condition #1 concerns operation kinds, which are scale-in, scale-out and workload consolidation. In the judgment condition #2, there are logical operators "and" and "or"; in the judgment conditions #3-#8, there are items of respective judgment criteria. More precisely, in the case of the scale-in, due to the "and" condition, if all of the judgment conditions #3-#8 are satisfied, this means that the scale-in is executed. In the case of the scale-out, due to the "or" condition, if any one of the judgment conditions #3-#8 are met, this means that the scale-out is executed. Note that in this drawing, the symbol "<=" means being less than or equal to, "==" means being equal to, ">=" means being greater than or equal to, and ">" means being greater than.

Turning back to FIG. 2, the scale-in judgment unit 131 uses the load information that was acquired from the storage unit 111 by the load information save/acquisition unit 141 to determine whether the scale-in of the target cluster system is executable or not (at step S203 of FIG. 2). Specifically, it judges whether the load information acquired is less than or equal to a threshold value a that is preset to the target cluster system. For example, the threshold a is one of those values which are recited in the judgment conditions #3-#8, which values are indicated in the scale-in/scale-out columns of FIG. 6. If the load is less than or equal to the threshold a (i.e., "Yes" determination at step S203), it is judged that the scale-in is executable; then, proceed to step S204. If the load is greater than the threshold α ("No" determination at step S203), it is judged that the scale-in is not executable; then, go to step S210.

At step S204, the configuration information collection unit 125 collects configuration information of physical servers and virtual servers along with unused computing resource amounts held by these physical servers. Subsequently, the configuration information save/acquisition unit 142 stores the collected configuration information in the storage device 111 (at step S205). The scale-in target virtual server selection unit 132 selects from the collected configuration information a virtual server which is the optimum scale-in target (at step S206). A detailed explanation of the step S206 will be given later (with reference to FIG. 21).

The scale-in execution unit 133 applies scale-in processing to the cluster system and then deactivates the virtual server that is specified as the deactivation target after having executed the scale-in (at step S207). A concrete procedure of the scale-in will be described later. Thereafter, the physical server power-off OK/NG judgment unit 126 determines whether there is a virtual server which is operating on the physical server with the scale-in applied thereto (at step S208). If such operating virtual server-exists (Yes at step S208), it is judged that power-off of the physical server is not executable; then, proceed to step S210 which determines whether the scale-out is necessary or not. If such operating virtual server does not exist (No at step S208), the physical server power-off execution unit 127 powers off the scale-in-executed physical server (step S209); then, go to step S210. An example of the power-off of physical server here is performed by transmitting a stop signal to the deactivation target physical server by use of the currently available secure shell (SSH), Telnet, Web services or the like, for example.

A detailed procedure of the above-stated selection of the target virtual server which is specified as the deactivation target after execution of the scale-in, which is executed by the scale-in target virtual server selection unit 132 at the step 206, will be explained with reference to FIG. 21.

Figure 21:
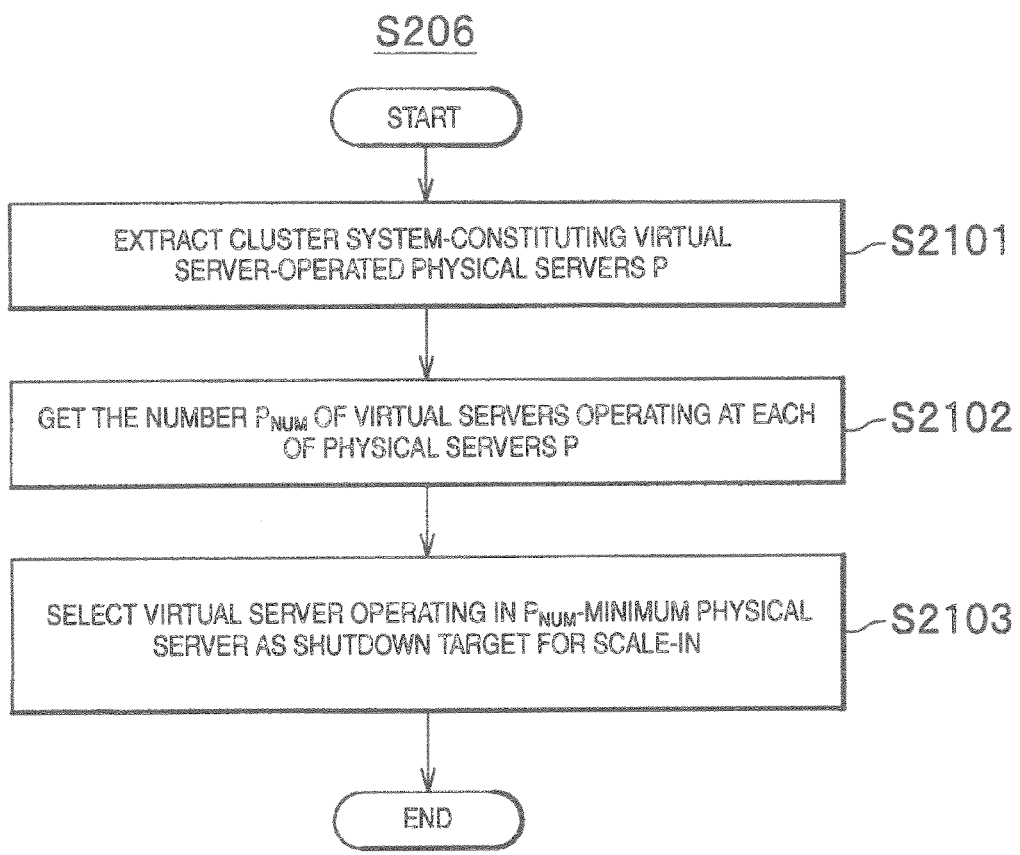
FIG. 21 is a diagram showing a flow of scale-in target virtual server selection processing.

FIG. 21 is a diagram showing a flow of the scale-in target virtual server selection processing. Firstly, a physical server group P is extracted (at step S2101), in which are operating virtual servers which constitute a scale-in capable cluster system. Next, the number $P_{NUM}$ of virtual servers operating in each physical server within the physical server group P is acquired. This virtual server number is such that those virtual servers constituting other cluster systems are included therein (at step S2102). Finally, a process is performed to select a physical server which is least in the acquired operative virtual server number $P_{NUM}$ and then specify this selected virtual server as the virtual server that becomes the deactivation target after execution of the scale-in (step S2103).

Note that the configuration information collection unit 125 may be arranged, to collect power-consumption amounts of the above-stated operating physical servers, which are stored in the storage device by the configuration information save/acquisition unit 142. At this time, in the step S206, when selecting a virtual server of the scale-in target, the scale-in target virtual server selection unit 132 of configuration change target selection unit 122 may be arranged so that it further acquires from the configuration information a power consumption amount of the physical server on which is operating the virtual server to be deactivated in the scale-in event, and determines a virtual server operating on a physical server which is greater in the acquired power consumption amount to be the virtual server that becomes the deactivation target at the time of the scale-in.

Figure 3:
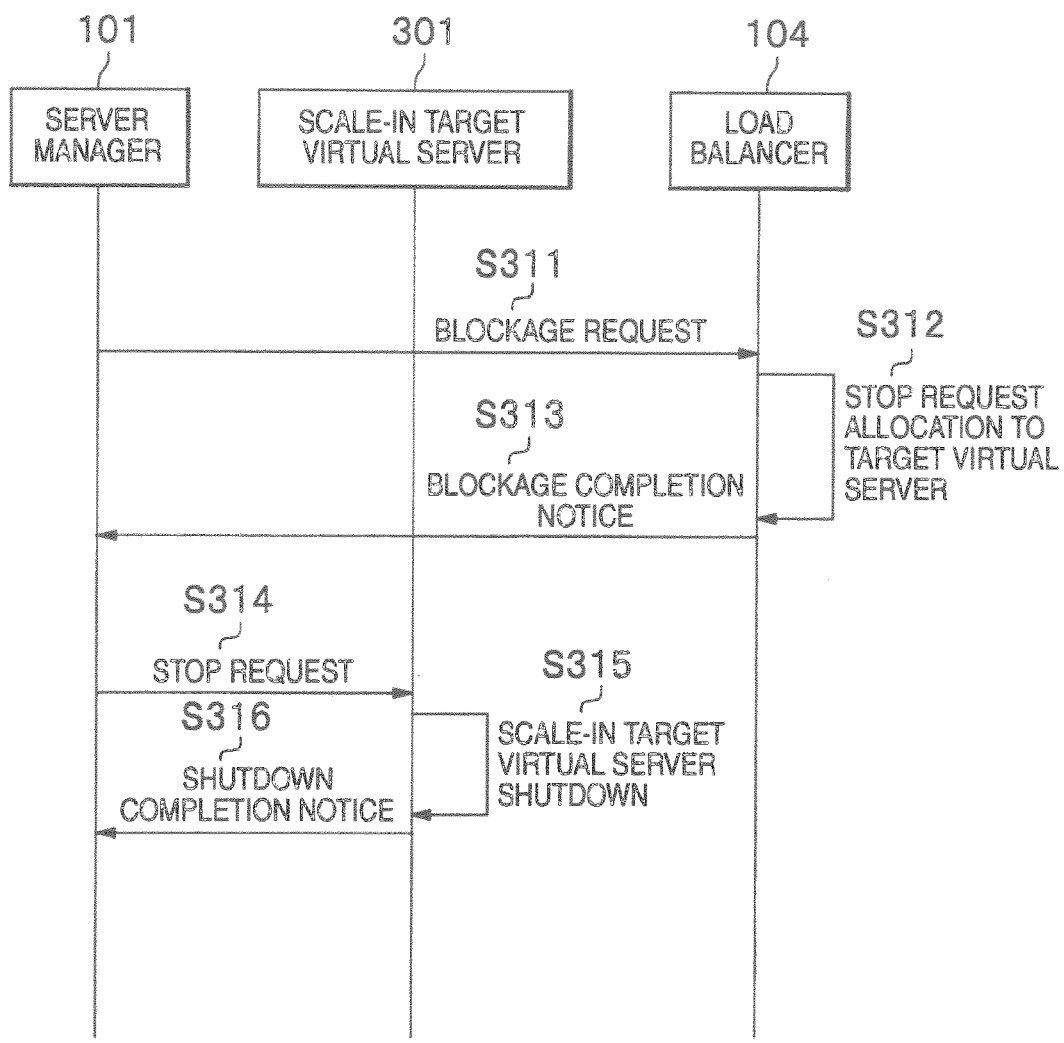

FIG. 3 is a diagram showing an execution sequence of scale-in processing. A detailed procedure of the scale-in will be explained with reference to the sequence diagram of FIG. 3. First, a request for blockage of a virtual server 301 which is the deactivation target (scale-in target) is issued to the load balancer 104 (at step S311); in responding thereto, the load balancer 104 stops request allocation to the deactivation target virtual server (at step S312). The load balancer 104 notifies the server management apparatus 101 of the fact that the blockage processing is completed (step 3313), upon receipt of the blockage processing completion notice, the server management apparatus 101 sends a deactivation request to the virtual server 301 of the deactivation target (step S314); then, this deactivation target virtual server 301 executes the deactivation processing (step S315). Finally, the server management apparatus 101 receives a deactivation completion notice (step S316). Additionally, it is reconvmendable that the server management apparatus 101 halts request allocation to the deactivation target virtual server at step S312 prior to shutdown of the virtual server that is specified as the deactivation target and, thereafter, deletes it from the cluster system at step S315.

Returning to FIG. 2, in the scale-out judgment unit 134, the load information save/acquisition unit 141 collects load information from the storage device 111 and determines whether the target cluster system's scale-out is necessary or not (at step S210). If the scale-out is unnecessary (No at step S210), proceed to step S217. If the scale-out is necessary (Yes at step S210), the configuration information collection unit 125 collects configuration information of physical and virtual servers and unused computing resource amounts held by physical servers (step S211). The configuration information collected is stored in the storage device 111 by the configuration information save/acquisition unit 142 (step S212).

The scale-out target physical server selection unit 135 selects from the collected configuration information a physical server to be regarded as the optimum scale-out target (at step S213). More specifically, first obtained is a physical resource amount β which is necessary for the cluster system to perform the scale-out processing. This physical resource amount β may be set in advance. Next, a physical server group P having its unused computing resource amount greater than the physical resource amount β is extracted from the physical server group 102 under management of the server management apparatus 101. Additionally, the physical server group P to be extracted may contain a physical server or servers being presently rendered inoperative. The configuration information of such presently deactivated physical servers is acquired from the past-obtained configuration information being saved in the storage device 111. Finally, a physical server which is largest in number of operative virtual servers is selected from the physical server group P as the physical server of scale-out target. In case the processing execution up to here results in absence of any scale-out target physical server, it is judged that the computing resources for the scale-out is deficient, followed by permitting completion of the processing after having notified a server administrator of the resource shortage.

The scale-out execution unit 136 verifies to determine whether the physical server of scale-out destination is currently powered on or off (step S214). If the scale-out destination physical server is powered off (No at step S214), the physical server power-on execution unit 128 powers on the scale-out target physical server (step S215); then, go to step S216. The physical server's power-on here is achieved by using the "Wake-up on LAN" technology to send a startup request via the communication device 114 to a network interface card (NIC) of the physical server to be activated. If the scale-out destination physical server has already been powered on (Yes at step S214), go to step S216.

The scale-out execution unit 136 applies scale-out processing to the selected physical server (step S216). After having executed the scale-out, verification is done to determine whether the processing of from the step S201 to step S216 has been completed with respect to the plurality of cluster systems being managed by the server management apparatus 101 (step S217). If the processing is completed (Yes at step S217), the processing is ended. If not yet completed (No at step S217), then the cluster system that becomes the scale-in/scale-out judgment execution target is modified, followed by reexecution of the step S201.

Figure 4:
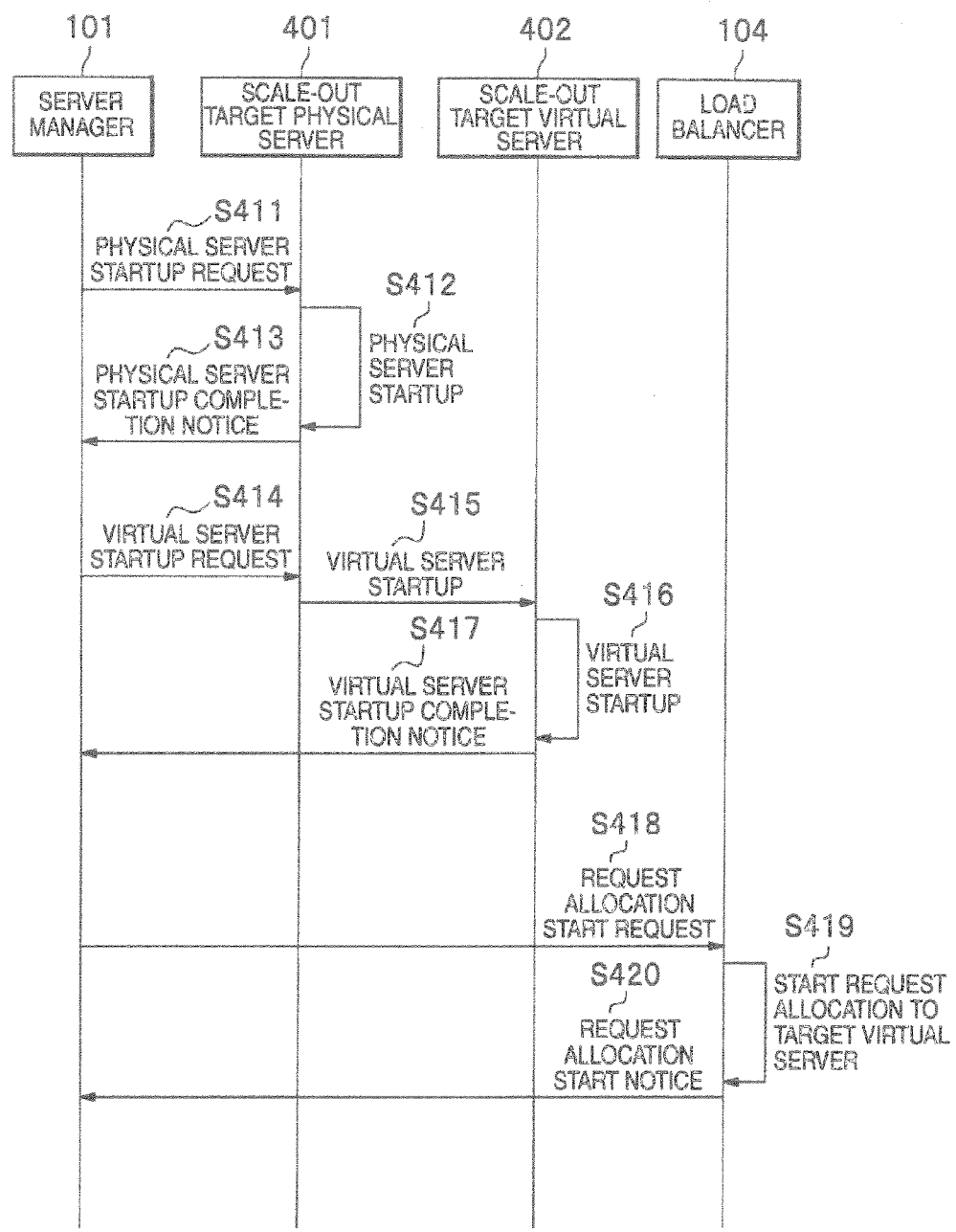
FIG. 4 is a diagram showing an execution sequence of scale-out.

FIG. 4 is a diagram showing an execution sequence of the scale-out execution processing. The flow of the scale-out execution processing will be explained with reference to the sequence diagram of FIG. 4. If a physical server 401 of the scale-out target is currently powered down then the server management apparatus 101 turns on the power supply of the scale-out target physical server 401 to thereby render it operative (at steps S411 to S413). If the scale-out target physical server 401 is powered on, a startup request of a virtual server 402 of the scale-out target is sent onto the scale-out target physical server 401 (at step S414). After startup of the scale-out target virtual server 402 (at step S415, S416), the scale-out target physical server 401 sends a startup completion notice to the server management apparatus 101 (step S417). Upon receipt of the startup completion notice, the server management apparatus 101 sends a client-request allocation start request to the load balancer 104 (step S418), and starts request allocation to such newly activated virtual server (step S419). Finally, the server management apparatus 101 receives from the load balancer 104 a request allocation start notice (step S420). In other words, in the scale-out execution, the server management apparatus 101 adds the activated virtual server to the cluster system and then gets the request allocation started.

In this embodiment, selection of a scale-in target from among those physical servers less in operative virtual server number in the way stated supra makes it possible to concentrate operative virtual server number-decreased physical servers to a specific-physical server. This results in occurrence of a bias of operative virtual server number between physical servers; thus, it is possible to achieve the intended workload consolidation by execution of a decreased number of virtual server migrations when compared to prior art techniques.

Furthermore, by selecting the scale-out target from among those physical servers with a larger number of operative virtual servers, it is possible to consolidate virtual servers on a specific physical server. This makes it possible for physical servers less in virtual server number to retain a virtual server number-decreased state; thus, it is possible to achieve the physical server power-off due to the scale-in by performing no virtual server migrations or a reduced number of migrations when compared to prior art schemes.

FIGS. 5A and 5B are diagrams showing effect examples in cases of controlling scale-in and scale-out targets by the virtual server number on a physical server. FIG. 5A is the case of only the scale-in being executed whereas FIG. 5B is the case of the scale-in being performed after execution of scale-out. Configuration information tables 501, 511, 521, 531-533 and 541-543 shown in FIGS. 5A-5B indicate configuration information of physical servers and virtual servers in a similar manner to the configuration information table 2211 of FIG. 22. Specifically, the configuration information tables 511 and 531-533 are configuration information tables in accordance with this embodiment whereas the configuration information tables 521 and 541-543 are configuration information tables of a comparative example.

When the scale-in of the cluster system B in this embodiment is executed from the state of the configuration information table 501 shown in FIG. 5A, the result is establishment of the state of the configuration information table 511. The reason of this is that in this embodiment, a physical server #3 which is the physical server that is less in operative virtual server number is selected as the scale-in target. In this case, what is required for execution of workload consolidation is to move a single virtual server A3 of the physical server #3 to physical server #2 (i.e., the migration number is 1).

On the other hand, in the case of the technique of this embodiment being failed to be employed (i.e., in the case of the comparative example), the processing execution can often result in the state of configuration information table 521. In this case, it is necessary for execution of workload consolidation to migrate a couple of virtual servers B3 and B3 to the physical server #2 (i.e., the migration number is 2). In this example, using this embodiment makes it possible to reduce the virtual server migration number from 2 to 1. Additionally, cluster system load variations are occurrable in every moment, and the workload consolidation takes place more than once per day.

Next, regarding the scale-out processing for adding a virtual server of cluster system B also, an effect example of this embodiment will be shown. A result of executing the scale-out of this embodiment from the state of the configuration information table 501 shown in FIG. 5B is indicated by the configuration information table 531. This can be said because in this embodiment, a virtual server is deployable as the scale-out target and, simultaneously, a physical server #2 is selected which is the physical server that is greater in operative virtual server number. The scale-out target is a virtual server B4 of the physical server #2. Thereafter, the cluster system B decreases in workload, and a result of execution of scale-in by the embodiment technique is indicated in the configuration information table 532. The reason of this is as follows: in this embodiment, the scale-in target is selected from a physical server #3 which is the physical server that is less in operative virtual server number. The scale-in target is a virtual server B3 of the physical server #3. Further, the cluster system A's load decreases, and the result of execution of scale-in by the embodiment technique is indicated in the configuration information table 533. The reason of this is that in this embodiment, the scale-in target is selected from a physical server #3 which is the physical server that is less in operative virtual server number. The scale-in target is a virtual server A3 of the physical server #3. In the configuration information table 533, the result becomes the state that enables power-off of the physical server #3 without having to execute the workload consolidation (i.e., the migration number is 0).

In the case of this embodiment not being employed (in the case of the comparative example), there are cases where the result becomes the state of the configuration information table 541. The scale-out target is a virtual server B4 of the physical server #3. Thereafter, the cluster system B decreases in workload, and the result of the scale-in execution is indicated in the configuration information table 542. The scale-in target is a virtual server B1 of physical server #1. Further, the cluster system A decreases in load, and the result of scale-in execution is indicated in the configuration information table 543. The scale-in target is a virtual server A3 of physical server #3. To power off the physical server #3 from the state of configuration information table 543, it is needed to migrate the virtual server B3 of physical server #3 to the physical server #1 and also move the virtual server B4 of physical server #3 to the physical server #2. Hence, the migration number becomes 2. In this example, using this embodiment technique makes it possible to reduce the migration number from 2 to 0.

As apparent from these two examples, according to this embodiment, scale-in processing is executed by selecting a scale-in target from a physical server which is less in number of in-operation virtual servers while executing scale-out by selecting a scale-out target from a physical server that is greater in operative virtual server number, thereby making it possible to reduce a total number of virtual server migration processes.

Embodiment 2

An embodiment 2 is the one that is similar to the server management apparatus 101 of the embodiment 1 with an additional means being provided therein, which is for selecting a physical server of the scale-out target by leveraging a degree of load variation similarity of each of a plurality of cluster systems at the time of scale-out judgment. The load variation similarity as used herein is a degree of coincidence of a cluster system-constituting virtual server number-increasing/decreasing time period and stay-constant time period and, further, virtual server number change rate at that time. In cluster systems which coincide with each other in the load variation similarity, migration is performed to a state which is simultaneously less or greater in cluster system-constituting virtual server number. To derive this load variation similarity through computation, a time period with the cluster system-constituting virtual server number staying constant and information of a virtual server number within this period are acquired from the cluster systems. From the information obtained, it can be seen that a time period other than the virtual server number stay-constant period is a time period with virtual servers changing in number. Further, a difference in virtual server number between adjacent virtual server number stay-constant time periods which are before and after the virtual server-changing time period is definable by calculation to be an increase/decrease rate—i.e., change rate.

The scale-out target physical server selection unit 135 selects a physical server that becomes the scale-out destination of a cluster system in such a manner that those virtual servers constituting a cluster system high in load variation similarity are gathered together at the same physical server. As a result, the virtual servers constituting a cluster system high in load variation similarity exist on the same physical server whereby scale-in events occur simultaneously in a plurality of cluster systems existing on the same physical server so that a chance to enable deactivation of virtual servers on the same physical server increases accordingly. In other words, a decrease in virtual server number due to virtual server deactivation after the scale-in execution becomes readily concentratable on the same physical server. Thus, it is possible to distribute a cluster system high in load variation similarity across a plurality of cluster systems and to achieve the physical server's power-off more quickly when compared to a case where the decrease in virtual server number is caused to disperse among physical servers. By use of the load variation similarity in this way, it is possible to further increase the chance to enable achievement of the physical server power-off by means of workload consolidation without performing migration of virtual servers.

Figure 7:
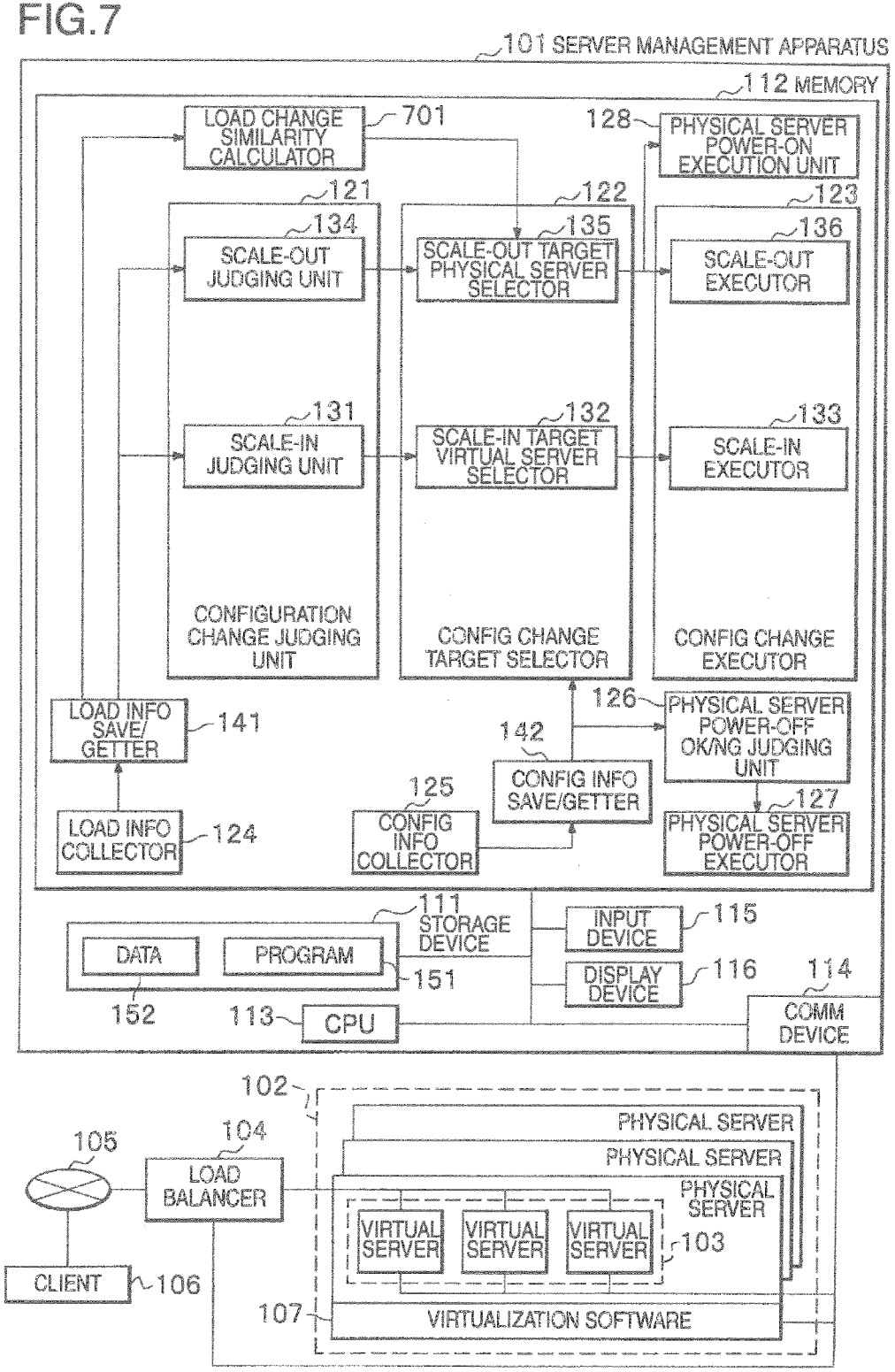
FIG. 7 is a diagram showing a cluster system in accordance with an embodiment 2.

FIG. 7 is a diagram showing a cluster system in accordance with the embodiment 2. As shown in FIG. 7, this embodiment is similar to the server management apparatus 101 of the first embodiment, with a software program of load variation similarity calculation unit 701 being added to the storage device 111 of server management apparatus 101. The load variation similarity calculation unit 701 calculates respective load variation similarities of a plurality of cluster systems from the past load information which was obtained from the storage device 111 by load information save/acquisition unit 141. A result of the calculation is used by the scale-out target physical server selection unit 135. The scale-out target physical server selection unit 135 selects a scale-out destination so that cluster systems high in load variation similarity are gathered together at the same physical server. A practical example of the processing to be performed by the load variation similarity calculation unit 701 will be explained with reference to a process flow diagram of FIG. 8.

Figure 8:
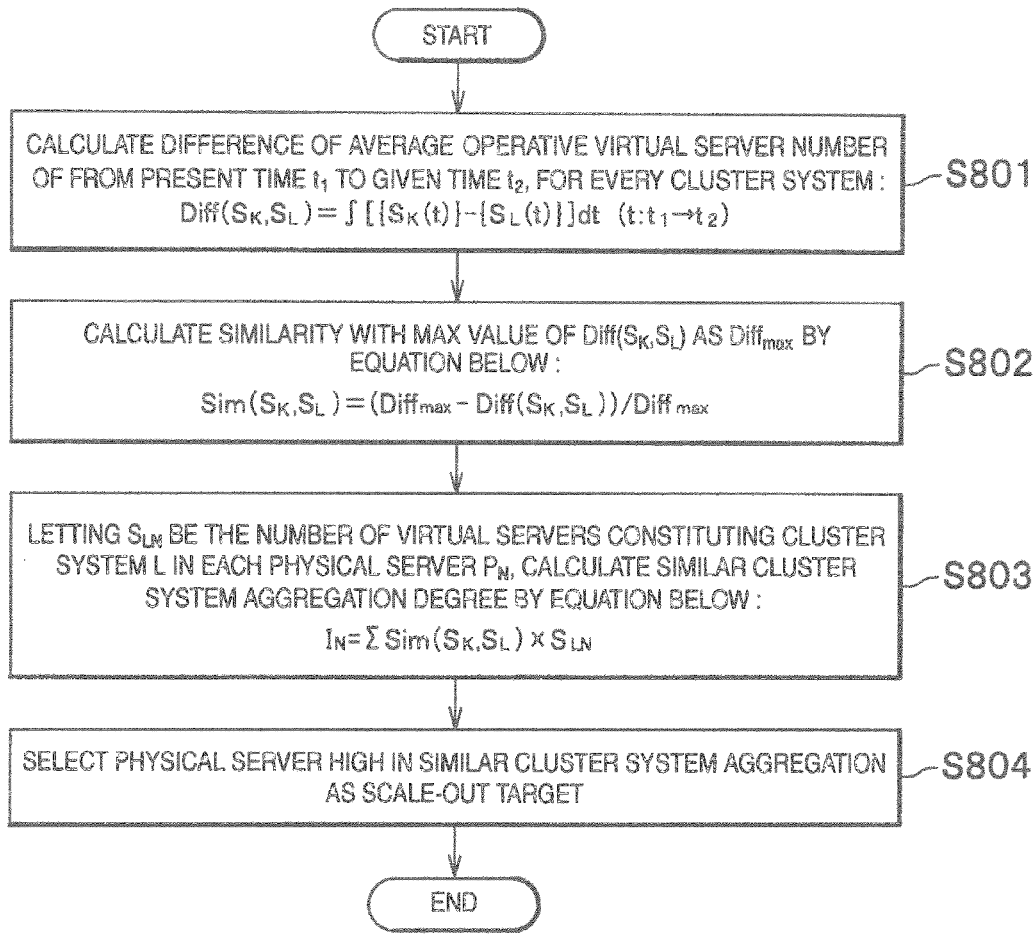
FIG. 8 is a diagram showing a flow of load variation similarity calculation processing of a cluster system.

FIG. 8 is a diagram showing a flow of the cluster system load variation similarity calculation processing. For a cluster system K, let $S_K(t)$ be the average value of the number of virtual servers operating in the cluster system K at a specific time point t of every day, every week or every month; for a cluster system L, let $S_L(t)$ be the average value of the number of virtual servers operating therein at a specific time point t of every day, every week or every month. In FIG. 8, the load variation similarity calculation unit 701 extracts the load variation similarity from load information with its timing being the same as that of execution of extraction processing. The timing, here, is a day of the week, a month or a specific day; for example, the load variation similarity calculation unit 701 uses the average value of a number of virtual servers that have been in operation at a specific time point t of every Friday to extract the load variation similarity on Friday. The day of the week, month or specific day for acquisition of the load information may be set alone or combined together.

Letting $\text{Diff}(S_K, S_L)$ be a difference between past-operated virtual server number average values within a time period of from a given time point $t_1$ up to a given time point $t_2$, this $\text{Diff}(S_K, S_L)$ is calculated for every cluster system (at step S801 of FIG. 8). For example, this $\text{Diff}(S_K, S_L)$ calculation is carried out using integration in a way which follows:

$$\text{Diff}(S_K, S_L) = \int [S_K(t) - S_L(t)] dt (t: t_1 \to t_2).$$

To compute the value $\text{Diff}(S_K, S_L)$, weighting may be applied to the past-operated virtual server number within a prespecified time period (e.g., a period of from a time point $t_0$ to the present time $t_2$, where $t_0$ is earlier than $t_2$ by a fixed length of time) in such a way as to receive more significantly the influence of a result of nearer past. Alternatively, the value may be a difference of the number of virtual servers that have been set in operation within the period of from a time point $t_0$ to present time $t_2$, where $t_0$ is earlier than $t_2$ by a fixed length of time. Letting $\text{Diff}_{max}$ be the maximum value of the difference Diff that was calculated with respect to every cluster system, the similarity is calculated by the following equation (at step SS02):

$$\text{Sim}(S_K, S_L) = (\text{Diff}_{max} - \text{Diff}(S_K, S_L))/\text{Diff}_{max}.$$

To derive the $\text{Sim}(S_K, S_L)$, weighting may be applied in such a manner as to increase the similarity of those cluster systems which coincide with each other in the period with a smaller number of operative virtual servers for a longer time than the period with a larger number of operative virtual servers; alternatively, $\text{Diff}(S_K, S_L)$ values are sequenced in descending order, and its number may be used as the similarity. Still alternatively, a total sum of time points whereat the value $S_K(t) - S_L(t)$ becomes zero within a period between the time $t_1$ and $t_2$ is calculated as $T_{KL}(t_1 \to t_2)$, which may be used as the similarity of the cluster systems K and L.

The load similarity calculated in the way stated above is used in the case of selecting a physical server of the scale-out target. For example, letting $S_{LN}$ be the number of virtual servers constituting the cluster system L in each physical server $P_N$, a degree of consolidation $I_N$ of similar cluster systems with respect to the cluster system K is calculated by the following equation (step S803):

$$I_N = \Sigma \text{Sim}(S_K, S_L) \times S_{LN}.$$

A physical server that is high in this similar cluster system consolidation degree $I_N$ is selected as the scale-out target (at step S804). In cases where there are found more than two physical servers that are the same as each other in similar cluster system consolidation degree in, a physical server of less power consumption may be specified as the scale-out target by using the data of power consumption of each physical server of the physical server group 102 as has been collected in advance by the configuration information collection unit 125.

With the above-stated processing, those cluster systems which are similar in load variation to each other are consolidated at the same physical server; thus, in the case of the scale-in being executed due to a decrease in cluster system workload, virtual servers on the same physical server become deactivation targets. Virtual servers are intensively deactivated together in a specific physical server; so, the opportunity for physical server power-off increases.

In this embodiment, the load variation similarity calculation may be performed by using various kinds of methods. The load variation similarity calculation unit 701 may be arranged to acquire the past load variation data and the operative virtual server number at that time on a per-cluster system basis and then judge as high-similarity cluster systems those cluster systems which are greater in the length of a time period in which the operative virtual server numbers of these cluster systems are identical to each other.

The load variation similarity calculation unit 701 acquires a workload state within a specified time period, e.g., once per hour, and obtains a difference between a load amount at the finish time and a load at the start time: if the difference is positive, then it is determined that a load variation is on an upward trend; if negative, it is judged that the load variation is on a downward trend. Thus it is possible to judge that cluster systems which are identical in the upward trend period to each other and cluster systems identical in the downward trend period are high in load variation similarity.

The load variation similarity calculation unit 701 acquires as the load factor of cluster system a numerical value indicative of the ratio of an operative server's present load to the maximum load value that was set per cluster system. Those cluster systems that are similar in load factor's change with time are determinable to be high in load variation similarity. Note here that the maximum load value may be obtained from the past load state or, alternatively, may be a logical value of the maximum load value which is processable in the case of a cluster system becoming its maximal configuration or, still alternatively, may be manually set by an operations manager.

The load variation similarity calculation unit 701 may use a load variation similarity degree between cluster systems, which degree is set by the operations manager. At the time of establishing cluster systems or during execution, the operations manager inputs the load similarity between cluster systems to the server management apparatus. This load similarity is stored in the storage device as data, which will be read out by the load variation similarity calculation unit 701 for judging the load similarity.

The load variation similarity calculation unit 701 is able to determine that certain cluster systems which are identical to each other in the time period with a larger number of in-operation virtual servers of cluster system rather than in the period with a smaller number of operative virtual servers are higher in similarity.

The load variation similarity calculation unit 701 can determine that cluster systems which are identical in number of operating virtual servers in a nearer time zone after a decision-making time are more similar to each other.

The load variation similarity calculation unit 701 can extract the load variation similarity from the load information obtained at a timing which is the same as the timing for executing an extraction operation.

The load variation similarity calculation unit 701 can apply weighting to the number of virtual servers which were rendered operative in the past of a prespecified time in such a way as to judge that a load variation similarity of nearer past is higher.

Figure 9:
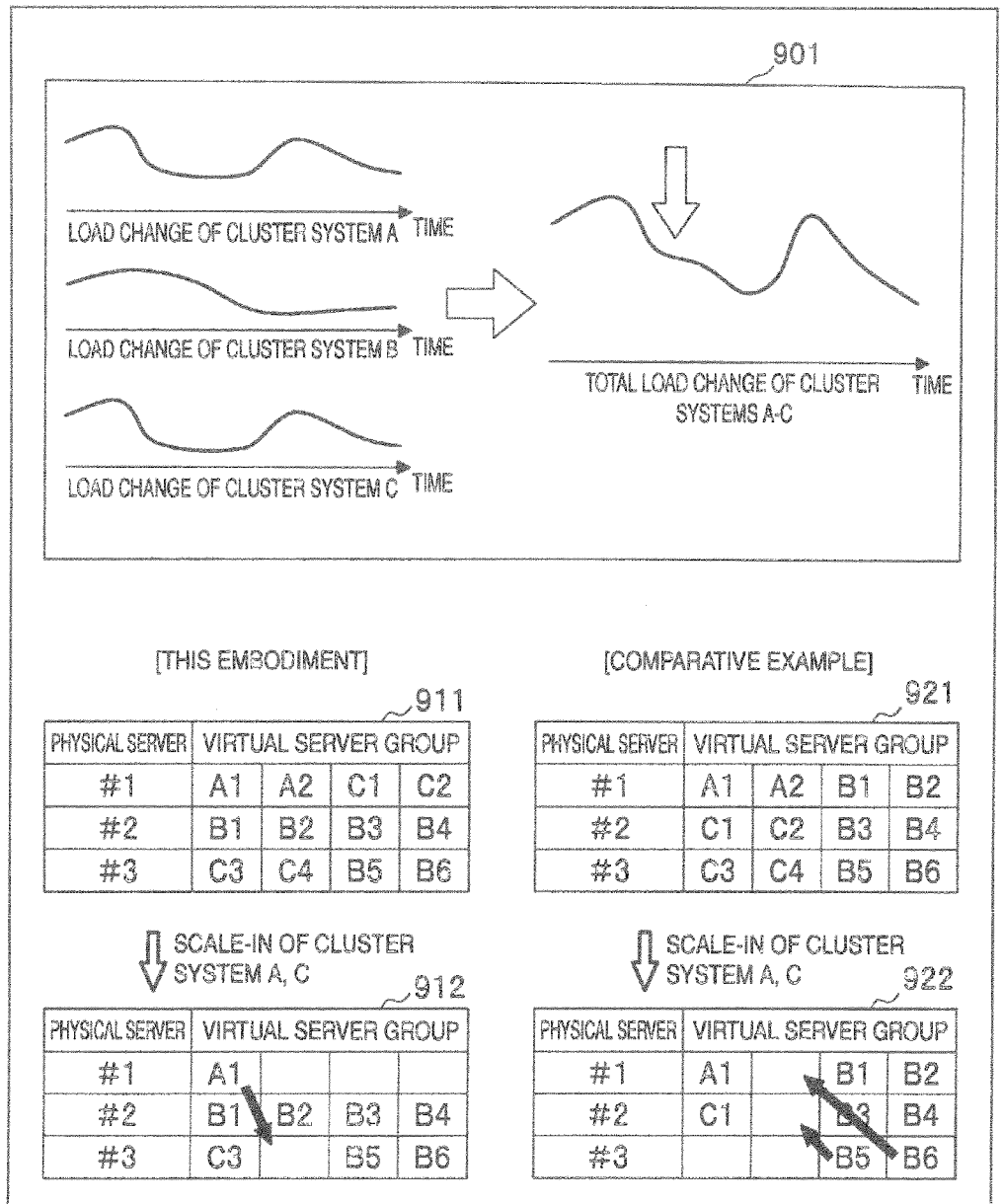
FIG. 9 is a set of diagrams showing an effect example in the case of applying the scale-out of cluster systems which are similar in load variation to the same physical server.

FIG. 9 is a set of diagrams showing an effect example in the case of performing scale-out of those cluster systems which are similar in workload variation to the same physical server. This example assumes an environment in which the server management apparatus 101 manages cluster systems A, B and C on three separate physical servers. The cluster system A, B, C is configured from virtual servers A1-A2, B1-B6, C1-C4, respectively. In a load variation summation diagram 901, there are shown load changes with time of the cluster systems A, B, C and a total sum of these load changes.

The load variation similarity calculation unit 701 determines that those cluster systems which are identical to each other in a time period with a larger number of in-operation virtual servers of cluster system rather than in a period with a smaller number of operative virtual servers are higher in similarity. In this example, the cluster system A and the cluster system C are judged to be high in load variation similarity.

In the scale-out processing of this embodiment, those virtual servers constituting the cluster systems A and C are scaled out to the same physical server. Accordingly, in case the load is the highest, a result of scale-out becomes the state of a configuration information table 911. More specifically, a physical server #1 is such that the virtual servers A1-A2 of cluster system A and the virtual servers C1-C2 of cluster system C are placed therein.

Thereafter, the workload of the cluster system A, C falls from the state of the configuration information table 911; after having executed the scale-in of this embodiment, the result is a change to the state of a configuration information table 912. More precisely, this is the state that the virtual server A2 which is specified from the cluster system A is deactivated while at the same time deactivating the virtual servers C1-C2 and C4 of cluster system C. To execute workload consolidation from this state, the virtual server A1 of physical server #1 is migrated to a physical server #3 (the migration number is 1).

In a comparative example, load variation-different cluster systems A-B and cluster systems B-C are scaled out to the same physical server, for example. Therefore, in case the load is the highest, the scale-out results in a change to the state of a configuration information table 921. More specifically, the physical server #1 is such that the virtual servers A1-A2 of cluster system A and the virtual servers B1-B2 of cluster system B are disposed therein. As for a physical server #2, the virtual servers C1-C2 of cluster system C and virtual server B3-B4 of cluster system B are placed therein. Similarly, the physical server #3 is such that the virtual servers C3-C4 of cluster system C and virtual servers B5-B6 of cluster system 3 are placed therein.

Thereafter, the workloads of the cluster systems a and C fail from the state of a configuration information table 921; after having executed the scale-in of this embodiment, the result becomes the state of a configuration information table 922. More precisely, this state is such that the virtual server A2 which is from the cluster system A and the virtual servers C2, C3 and C4 of cluster system C are deactivated together. To execute workload consolidation from this state, the virtual server B5 of physical server #3 is migrated to the physical server #2; simultaneously, the virtual server B6 of physical server #3 is moved to the physical server #1 (the migration number is 2).

In this example, the use of this embodiment technique makes it possible to reduce the virtual server migration number from 2 to 1. As apparent from the foregoing, by selecting a scale-out destination using the load variation similarity of this embodiment in the way stated above, it is possible to reduce the virtual server migration number at the time of workload consolidation processing.

Embodiment 3

An embodiment 3 is the one that adds to the server management apparatus 101 of the embodiment 1 a means for performing migration of a virtual server(s) after execution of the scale-in processing to thereby execute virtual server workload consolidation, thus making it possible to turn off the power supply of a surplus physical server(s). As for the workload consolidation here, appropriate control is provided to execute this processing only when it is possible to power down a physical server by migration of a virtual server(s) thereto while preventing execution of any load consolidation with no power consumption reducing effect.

Figure 10:
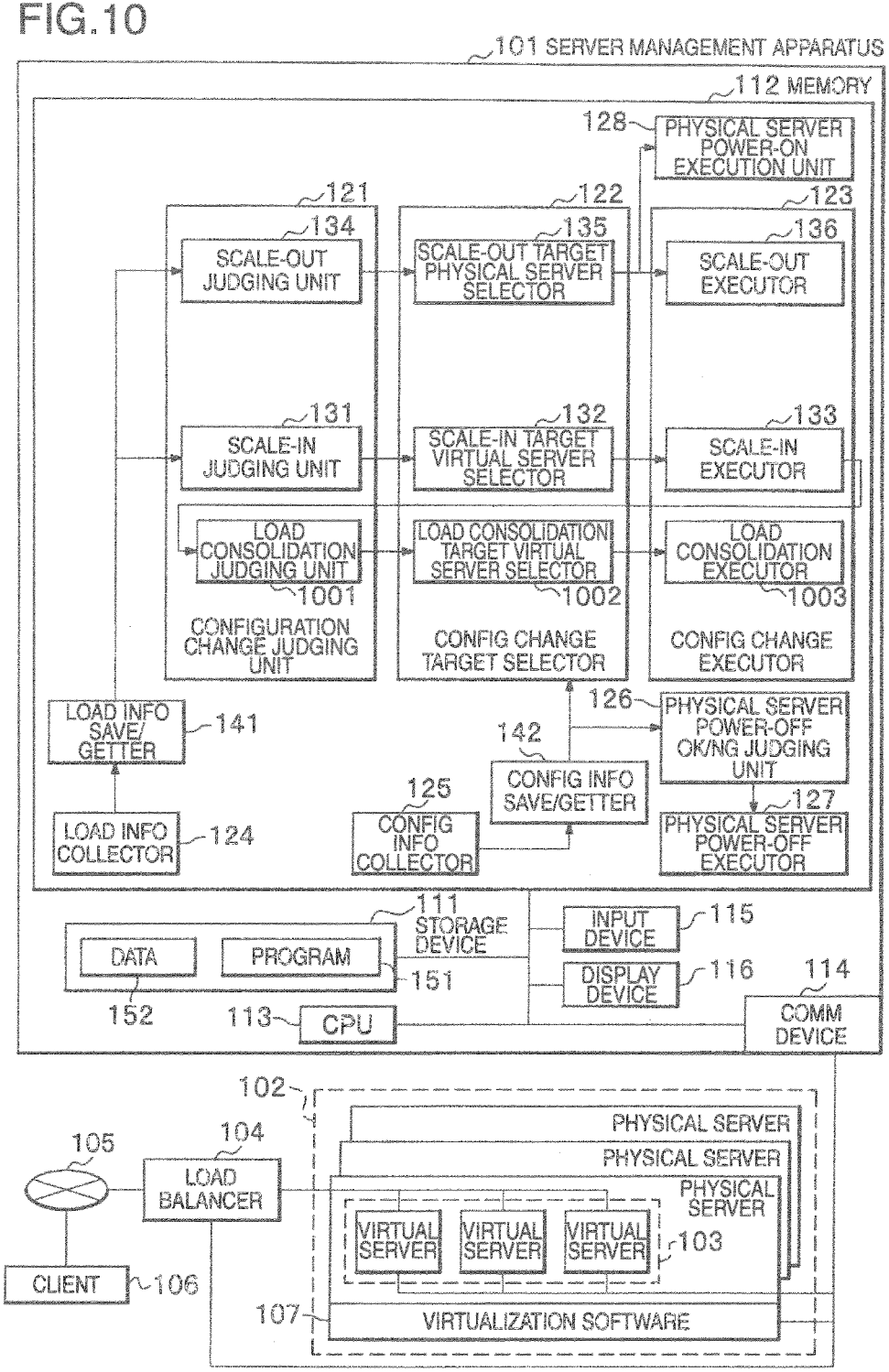
FIG. 10 is a diagram showing a cluster system in accordance with an embodiment 3.

FIG. 10 is a diagram showing a cluster system in accordance with the embodiment 3. As shown in FIG. 10, respective software programs of a workload consolidation judgment unit 1001, workload consolidation target virtual server selection unit 1002 and workload consolidation execution unit 1003 are added to the storage device 111 of the server management apparatus 101 of FIG. 1. Detailed explanations of the workload consolidation judgment and execution processes will be given with reference to a flow diagram of FIG. 11 below.

Figure 11:
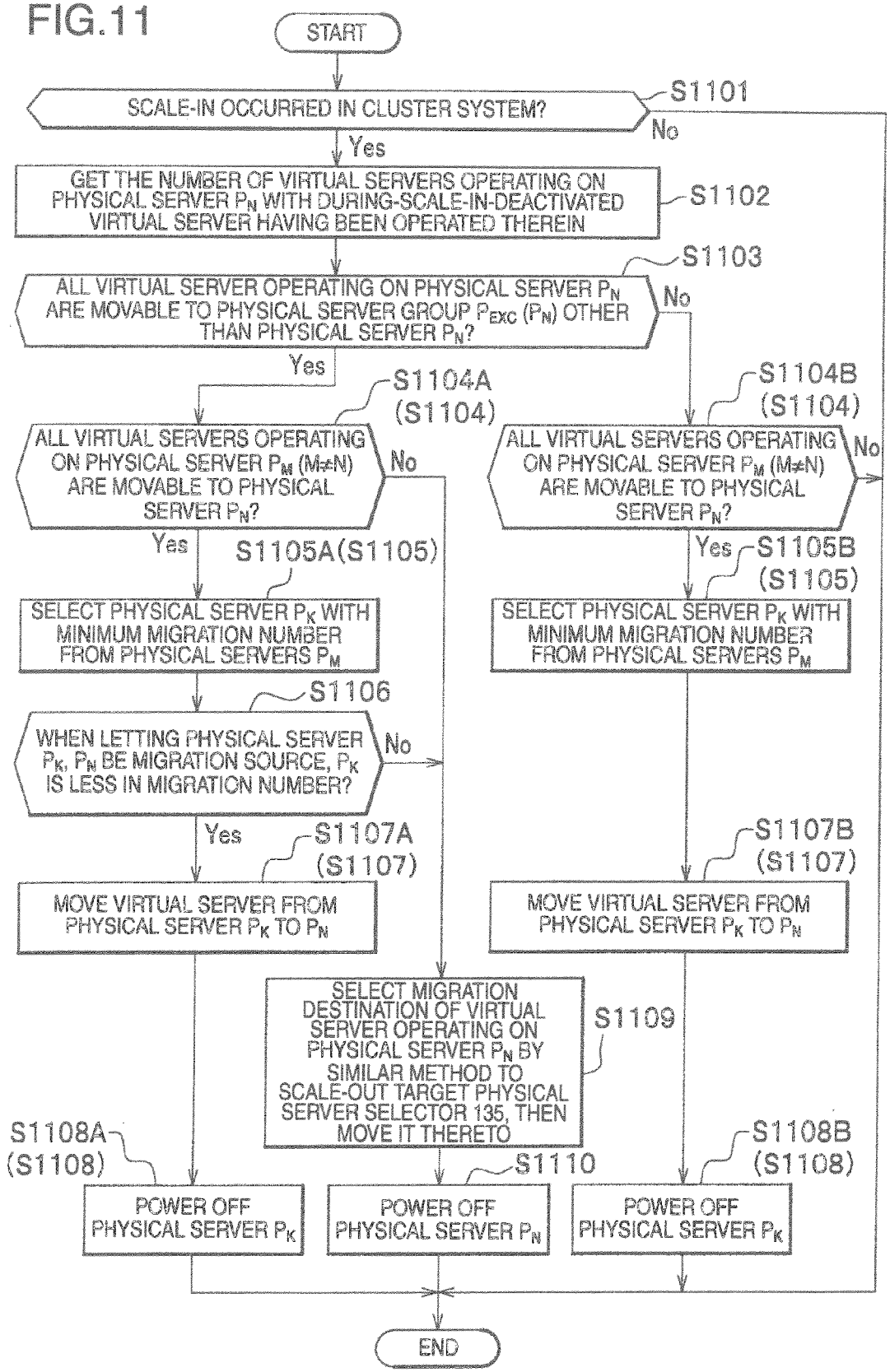
FIG. 11 is a diagram showing a process flow of workload consolidation judgment and workload consolidation execution processing.

FIG. 11 is a diagram showing a process flow of the workload consolidation judgment and workload consolidation execution processing. Reference is also made to FIG. 10, where necessary. The workload consolidation judgment unit 1001 determines which one of a plurality of cluster systems experienced the occurrence of a scale-in event (step S1101). If the scale-in occurs ("Yes" at step S1101), then proceed to step S1102 which executes workload consolidation judgment. If the scale-in does not occur ("No" at step S1101), it is judged that execution of workload consolidation does not make it possible to perform the power-down of physical server, followed by halting the processing.

The workload consolidation selection unit 1002 acquires a numerical value indicating the number of virtual servers operating on a physical server $P_N$ (at step S1102), where $P_N$ is the physical server in which a virtual server that was deactivated after execution of the scale-in has been rendered operative. The acquired in-operation virtual server number is used to determine which one of the workload consolidation for migrating the virtual server on the physical server $P_N$ to another physical server and the load consolidation for moving a virtual server operating on another physical server to the physical server $P_N$ is less in migration cost. To do this, the following two conditional judgments are performed continuously (step S1103).

(a) is it possible to migrate all of the virtual servers operating on the physical server $P_N$ to a physical server group $P_{EXC}(P_N)$ except the physical server $P_N$? (step S1103)

(b) is it possible to migrate ail virtual servers operating on a physical server $P_M$ ($M \neq N$) to the physical server $P_N$? (step S1104 (step S1104A, step S1104B))

If "Yes" at the step S1103 and also "Yes" at step S1104A (step S1104), then proceed to step S1105A (step S1105). If "Yes" at the step S1103 and "No" at step S1104A, then go to step S1109. If No at step S1103 and Yes at step S1104B then go to step S1105B (step S1105). If No at step S1103 and No at step S1104B (step S1104), it is judged that even when the workload consolidation is executed, physical servers are unable to be powered down; then, halt the processing.

If Yes at the step S1104A, it is very likely that a plurality of physical server candidates that become migration sources are present. Then, a physical server with its virtual server migration number becoming the minimum is selected as the migration source physical server $P_K$ (at step S1105A); then, go to step S1106.

In the case of the physical server $P_K$ and physical server $P_N$ being specified as migration sources, if the selection of physical server $P_N$ results in a decrease in virtual server transfer number (i.e., Yes at step S1106), then proceed to step S1107A (S1107). Otherwise (No at step S1106), go to step S1109. At step S1107A, all of the virtual servers operating on the migration source physical server $P_K$ are moved to physical server $P_N$ (i.e., the virtual servers are migrated from the physical server $P_K$ to physical server $P_N$). Thereafter, the physical server power-off execution unit 127 powers down the physical server $P_K$ (step S1108A). On the other hand, at step S1109, a virtual server migration destination on the physical server $P_N$ is selected by a method which is similar to that of the scale-out target physical server selection unit 135; then, the workload consolidation execution unit 1103 performs virtual server migration processing. Thereafter, the physical server power-off execution unit 127 turns off the power of physical server $P_N$ (step S1110), followed by halting the processing.

Similarly, if Yes at the step S1104B, it is very likely that there exist two or more physical server candidates that become migration sources. In this case, a physical server with its virtual server migration number being expected to become the minimum is selected as the migration source physical server $P_K$ (at step S1105B); then, all of the virtual servers operating on the migration source physical server $P_K$ are migrated together to tide physical server $P_N$ (step S1107B). Thereafter, the physical server power-off execution unit 127 powers off the physical server $P_K$ (step S1108B), followed by quitting the processing.

When executing the workload consolidation processing, it is needed to migrate a currently operating virtual server(s). Migration methods therefor include a method having the steps of deactivating an operating virtual server, modifying the configuration of a physical server, and rendering it operative again. Alternatively, there is a method which does not perform virtual server deactivation, an example of which is the so-called "live migration" technique for copying the memory contents owned by an in-operation virtual server to a migration destination to thereby realize the intended server migration while at the same time retaining such operation state. In the cluster system embodying the invention, substantially the same result is obtained even when the client request processing is done at any one of those virtual servers constituting the cluster system. By leveraging this nature, it is also possible to achieve the operation state-retaining virtual server migration in a pseudo-operational manner. This will be explained in detail with reference to FIG. 12 below.

Figure 12:
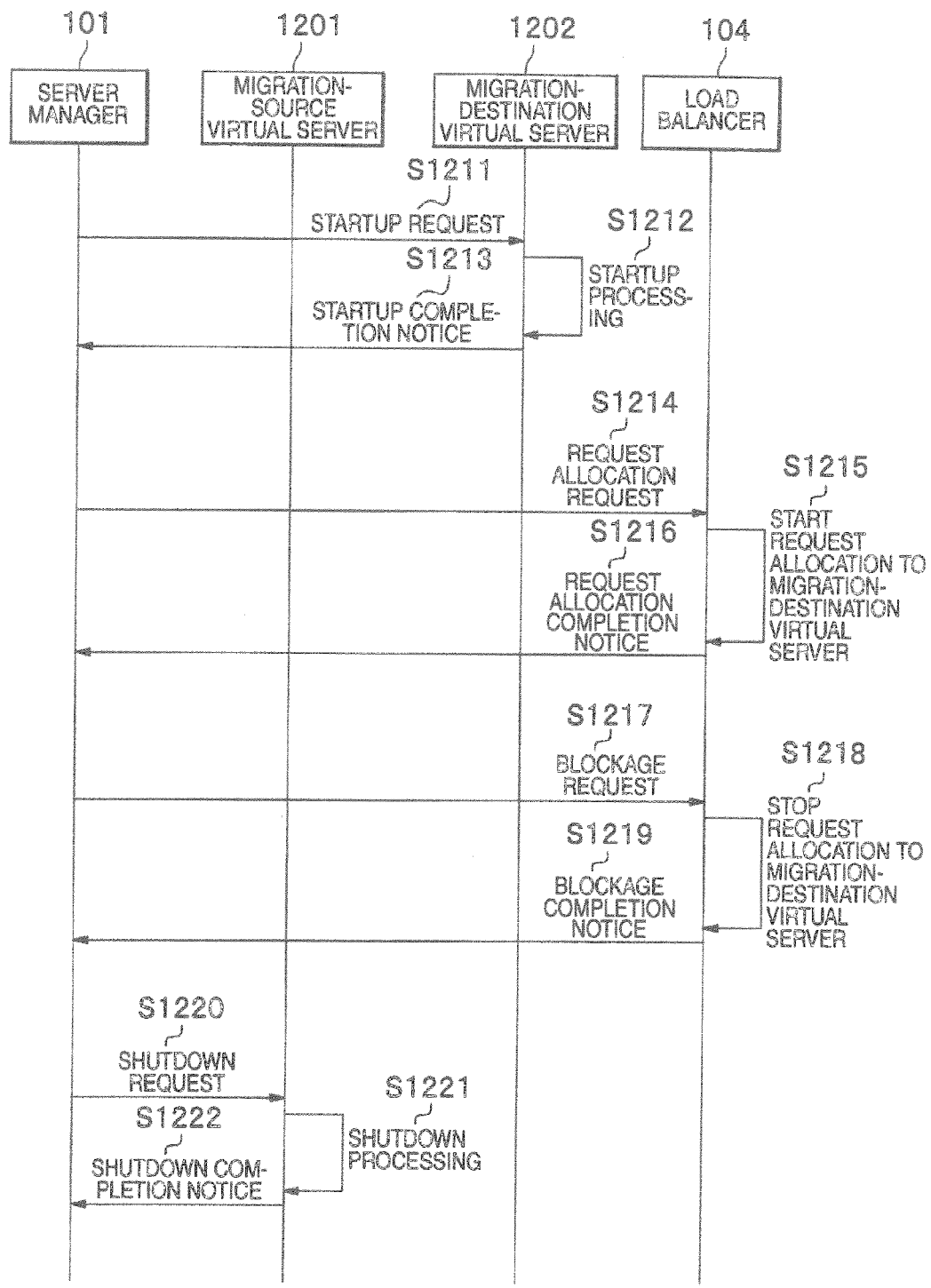
FIG. 12 is a diagram showing an execution sequence of virtual server pseudo-migration processing.

FIG. 12 is a diagram showing an execution sequence of the pseudo-migration processing of a virtual server. The server management apparatus 101 sends to the migration destination physical server a startup request with respect to a virtual server 1202 of migration destination, which exists on the migration destination physical server and which is in a deactivation state (step S1211), and performs migration destination virtual server startup processing (step S1212). Then, the migration destination virtual server 1202 performs a startup completion notifying operation (step S1213). Upon receipt of the startup completion notice, the server management apparatus 101 sends to the load balancer 104 a request for allocation of client requests aimed at the migration destination virtual server (step S1214); then, the load balancer 104 starts allocation of requests aimed at the migration destination virtual server (step S1215). Then, the load balancer 104 performs a request allocation completion notifying operation (step S1216).

The server management apparatus 101 which received the request allocation completion notice that is request allocation modification sends to the load balancer 104 a request for blockage of the migration source virtual server (step S1217); in responding thereto, the load balancer 104 stops the request allocation to migration source virtual server 1201 (step S1218). Then, the load balancer 104 performs a blockage completion notifying operation (step S1219). Upon receipt of the blockage completion notice that is request allocation halt, the server management apparatus 101 transmits a halt request to the migration source virtual server 1201 (step S1220); the migration source virtual server 1201 executes the requested half processing (step S1221). Then, the migration source virtual server 1201 performs a halt completion notifying operation (step S1222). Finally, the server management apparatus 101 receives the halt completion notice of the migration source virtual server 1201 and completes the pseudo-migration of virtual server from the migration source virtual server 1201 to migration destination virtual server 1202.

Embodiment 4

An embodiment 4 is the one that adds to the server management apparatus 101 of the first embodiment a means for controlling by workload variation prediction techniques the timing of scale-in/scale-out of a cluster system made up of virtual servers, thereby enabling suppression of an increase in power consumption due to repeated execution of physical server power-on/off operations.

Figure 13:
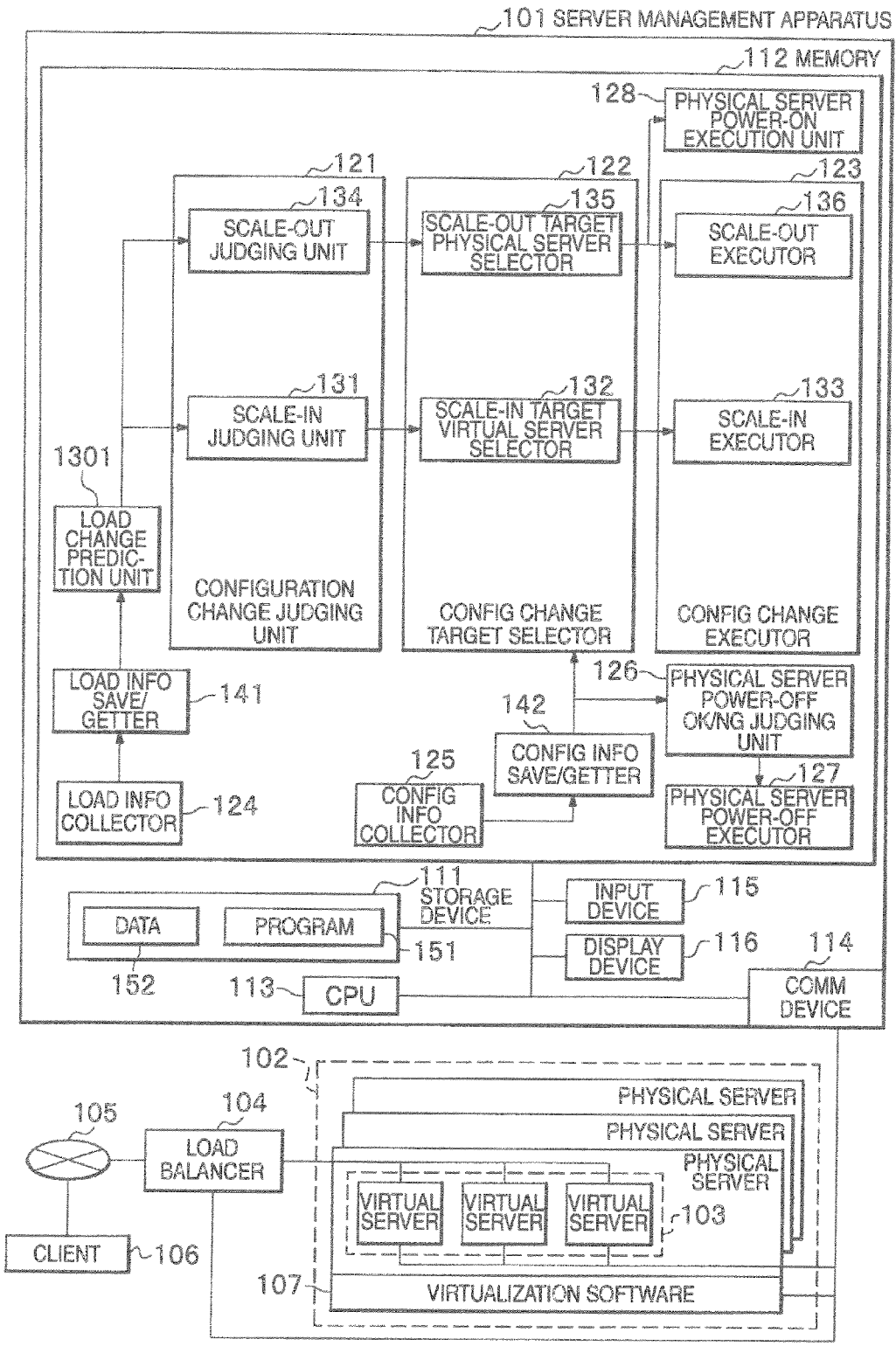
FIG. 13 is a diagram showing a cluster system in accordance with an embodiment 4.

FIG. 13 is a diagram showing a cluster system in accordance with the embodiment 4. As shown in FIG. 13, a software program of a load variation prediction unit 1301 is added to the storage device 111 of the server management apparatus 101 of FIG. 1. A detailed explanation of the processing for predicting a load variation and for modifying the scale-in/scale-out execution timing will be given with reference to a flow diagram of FIG. 14 below. Note that the load variation prediction unit 1301 may also be added to the server management apparatus 101 of the embodiments 2 and 3 stated supra.

Figure 14:
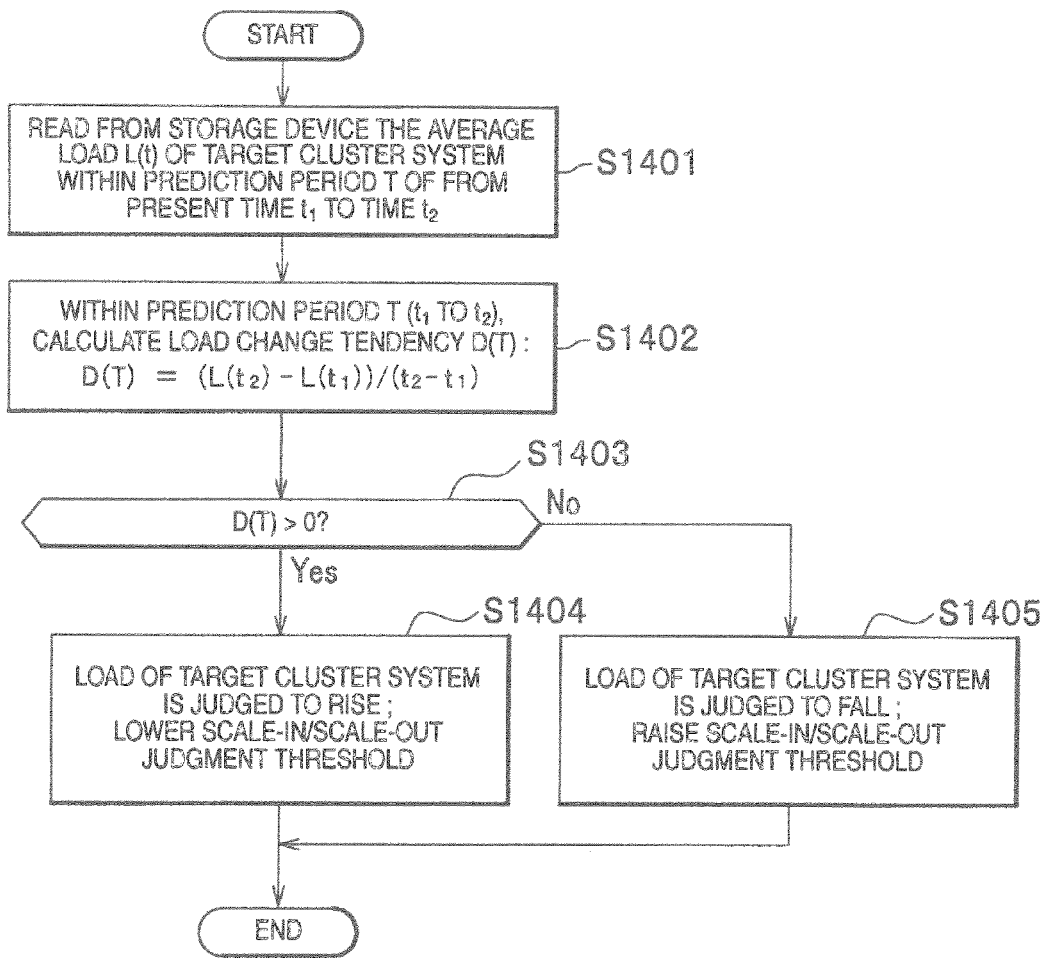
FIG. 14 is a diagram showing a flow of the processing for modifying the timing of scale-in/scale-out based on load variation prediction.

FIG. 14 is a diagram showing a flow of the processing for modifying the scale-in/scale-out timing based on load variation prediction. Reference is also made to FIG. 13 when need arises. The load variation prediction unit 1301 acquires the past load information of a target cluster system from the storage device 111 via load information save/acquisition unit 141. Then, an average value at time point t of the load information acquired is calculated as the average load L(t) (at step S1401). Specifically, the target cluster system's average load L(t) within a time period of from a present time $t_1$ to a time point $t_2$ after a prediction time period T is obtained from the storage device 111. Note that the average load L(t) here is an arithmetically averaged value of information owned by computing resources and applications at the same time point of every day, respectively. The load information arithmetic averaging processing may be carried out at the same instant of every week, every month, every year or a specific day, rather than every day. In short, the load variation prediction unit 1301 operates to predict the load variation tendency from the load information whose timing is the same as the timing for execution of load variation tendency prediction. The timing, here, is any one of a day of the week, month, or specific day; for example, the load variation prediction unit 1301 uses an average load value at the specific time point t of every Friday to predict a load variation in Friday. It may alternatively be any one of a day of the week, month and specific day for acquiring the load information or may be possible combinations thereof.

Then, the load variation tendency D(T) within a prediction time period $T(t_2-t_1)$ of from a time point $t_1$ to time point $t_2$, as an example, is calculated in the way which follows (at step S1402):

$$D(T)=(L(t_2)-L(t_1))/(t_2-t_1).$$

To derive this D(T), a weighted averaging-applied value of the average load L(t) may be used for the calculation in such a way as to receive more strongly the influence of a result of nearer past. Alternatively, by using not such average value but a difference of the load information at the present time $t_1$ from that at a time point to before the time $t_1$ by a prespecified length of time, the computation may be performed in a way which follows:

$$D(T)=(L(t_1)-L(t_0))/(t_1-t_0).$$

The load variation prediction unit 1301 determines whether the D(T) value is larger than zero or not (at step S1403). If D(T) is larger than 0 (D(T)>0) (i.e., "Yes" at step S1403), it is judged that the workload of a target cluster system is on an upward trend within the time period of interest; then, the threshold for use as the scale-in/scale-out judgment criterion is modified so that the scale-in processing is performed in a negative way. More specifically, those threshold values which are indicated in the threshold column of the threshold table 601 and which become scale-in/scale-out judgment criteria to be used by the scale-in judgment unit 131 and scale-out judgment unit 134 are lowered (at step S1404), followed by quitting the processing.

On the other hand, if D(T) is not larger than zero (D(T)≦0) (i.e., Yes at step S1403), it is judged that the load of the target cluster system is on a downward trend within the time period of interest; then, the threshold for use as the scale-in/scale-out judgment criterion is altered so that the scale-in is performed in a positive way. More precisely, the threshold values which are indicated in the threshold column of the threshold table 601 and which become scale-in/scale-out judgment criteria to be used by the scale-in judgment unit 131 and scale-out judgment unit 134 are made higher (at step S1405).

It is noted that in cases where the load variation tendency D(T) is sufficiently less (i.e., when it is nearly equal to zero), this is judged to be a steady state—in this case, the threshold that becomes the scale-in/scale-out judgment criterion may be arranged so that it is kept unchanged. Specifically, an administrator who manages the server management apparatus 101 inputs from the input device 115 a load variation width value ε which is used to determine that the cluster system's load is in its steady state. The server management apparatus 101 stores the variation width value ε as data in the storage device 111. At the step S1403 which determines whether the load is on an upward trend or on a downward trend, the data value ε stored in storage device 111 is read out. If an absolute value of D(T) value is greater than or equal to ε and, simultaneously, larger than zero, the load is judged to be on an upward trend. If the absolute value of D(T) is larger than or equal to ε and, simultaneously, not larger than 0, the load is judged to be on a downward trend. If the absolute value of D(T) 1s less than ε, the load is judged to be in its steady state; then, the processing is ended.

A process may also be employed for dividing the load variation tendency derivation period T into a number (N) of sub-periods and for deriving a load variation tendency in each of these sub-periods. In this case, the following scheme is employable: if a sub-period with both the upward trend and the downward trend exceeding a fixed value (prespecified value) is found within the period 1, it is judged to be in an unstable state; then, the scale-out is performed in an active way.

The cluster system's operation administrator may manually set to specify whether the load of a work is on an upward trend or on a downward trend. For example, a load variation tendency data indicating that the workload is on an upward trend within a time period of from 8:00 AM to 2:00 PM and is on a downward trend within a period of from 2:00 PM to 5:00 PM is input in advance by the system administrator as the data 152 of storage device 111. The load variation prediction unit 1301 judges the load variation tendency by reference to the load variation tendency data as read out of the storage device 111.

In the way stated above, by modifying the threshold in such a way as to suppress occurrence of the scale-in in the case of a present load variation being on an upward trend and facilitate the scale-in occurrence in the case of the load variation being on a downward trend, it is possible to prevent the scale-in/scale-out from repeating alternately.

Figure 15:
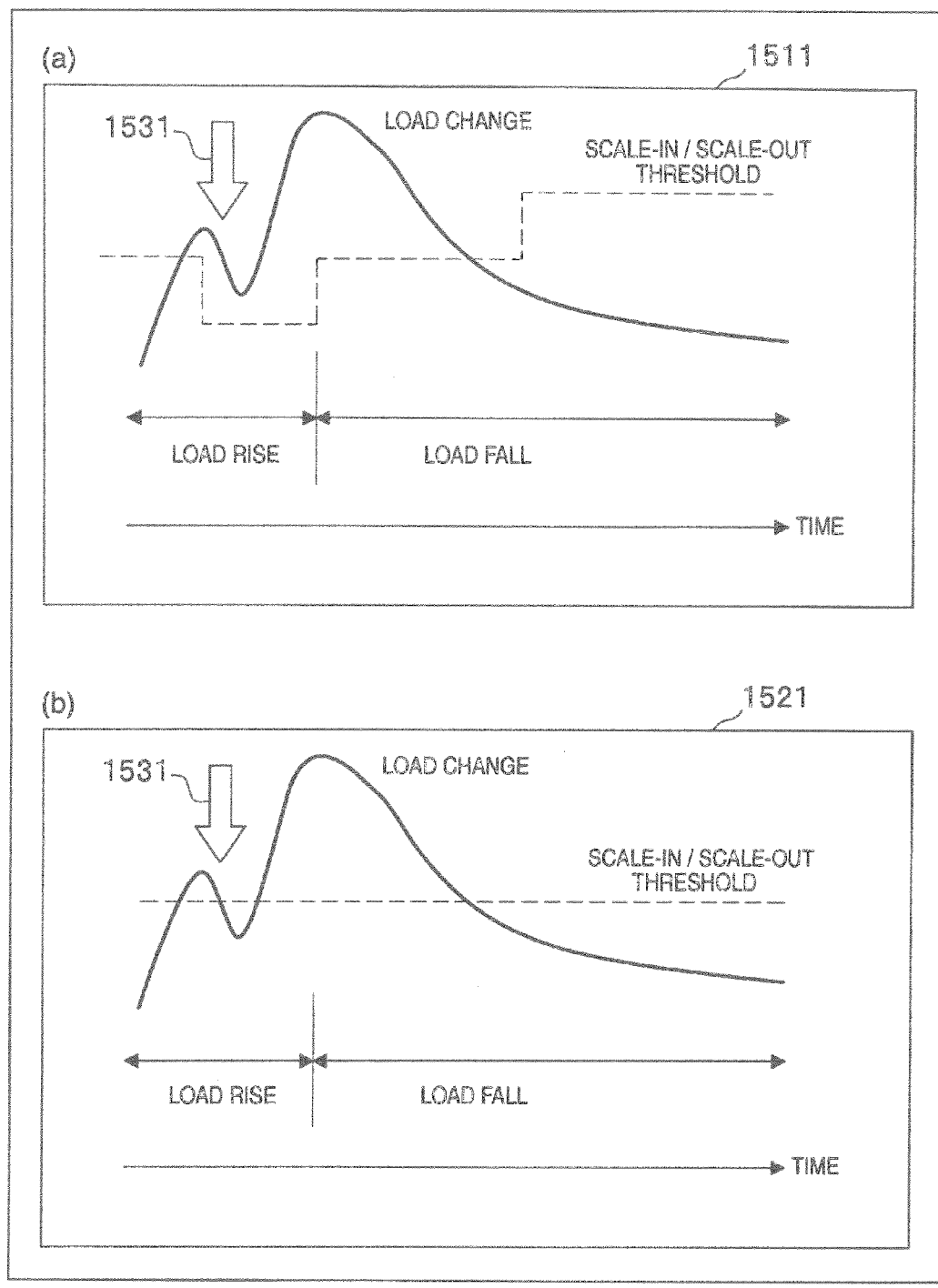
FIG. 15 is a diagram showing an effect example in the case of modifying the scale-in/scale-out timing based on the load variation prediction.

FIG. 15 is a diagram showing effect examples in the case of modifying the scale-in/scale-out timing based on the load variation prediction. In a graph 1511 indicated at part (a) of FIG. 15, there is shown a summary of a technique for lowering the scale-in/scale-out threshold when the load variation is on an upward trend: this is the case of the presence of a change in threshold. In a graph 1521 at part (b) of FIG. 15, a comparative example is shown, which indicates a method that does not modify the scale-in/scale-out threshold: this is the case of the absence of a change in threshold.

Typically, in a case where the load variation of the cluster system becomes less than the threshold, scale-in processing is executed; in case the former goes beyond the latter, scale-out is executed. In the graph 1511 with the presence of a change in threshold, the scale-in/scale-out threshold and the load variation cross together for a couple of times; so, the scale-in/scale-out is executed for two times. On the other hand, in the graph 1521 with the absence of a change in threshold, the scale-in/scale-out threshold and the load variation cross together for four times; so, the scale-in/scale-out is executed for four times. Of these processes, the scale-in/scale-out is executed for two times at a portion 1531 at which the load rises and falls within a short length of time period.

In this example, using this embodiment technique makes it possible to prevent alternately repeated execution of scale-in and scale-out at the portion 1531 whereat the load rises and falls within a short time period. Furthermore, by arranging the scale-in/scale-out to accompany the physical server power-on/off processing, it is possible to avoid an increase in power consumption otherwise occurring due to repeated execution of physical server power-on and power-off operations within a short time period.

Embodiment 5

An embodiment 5 is the one that adds to the server management apparatus 101 of first embodiment a means for delaying the scale-out timing by applying scale-up processing to a virtual server(s) constituting a cluster system. Delaying the timing causes the cluster system's processable request amount to increase accordingly, thereby lengthening the physical server power-off time. This makes it possible to enhance the power consumption reducing effect.

The scale-up is to increase the amount of computing resources, such as CPU, memory or else to be assigned to virtual servers, to thereby increase the number of requests to be processed at a time and operation speed. The computer resources may typically be unused computing resources that are held by a physical server in which a scale-up applied virtual server(s) is/are rendered operative.

Figure 16:
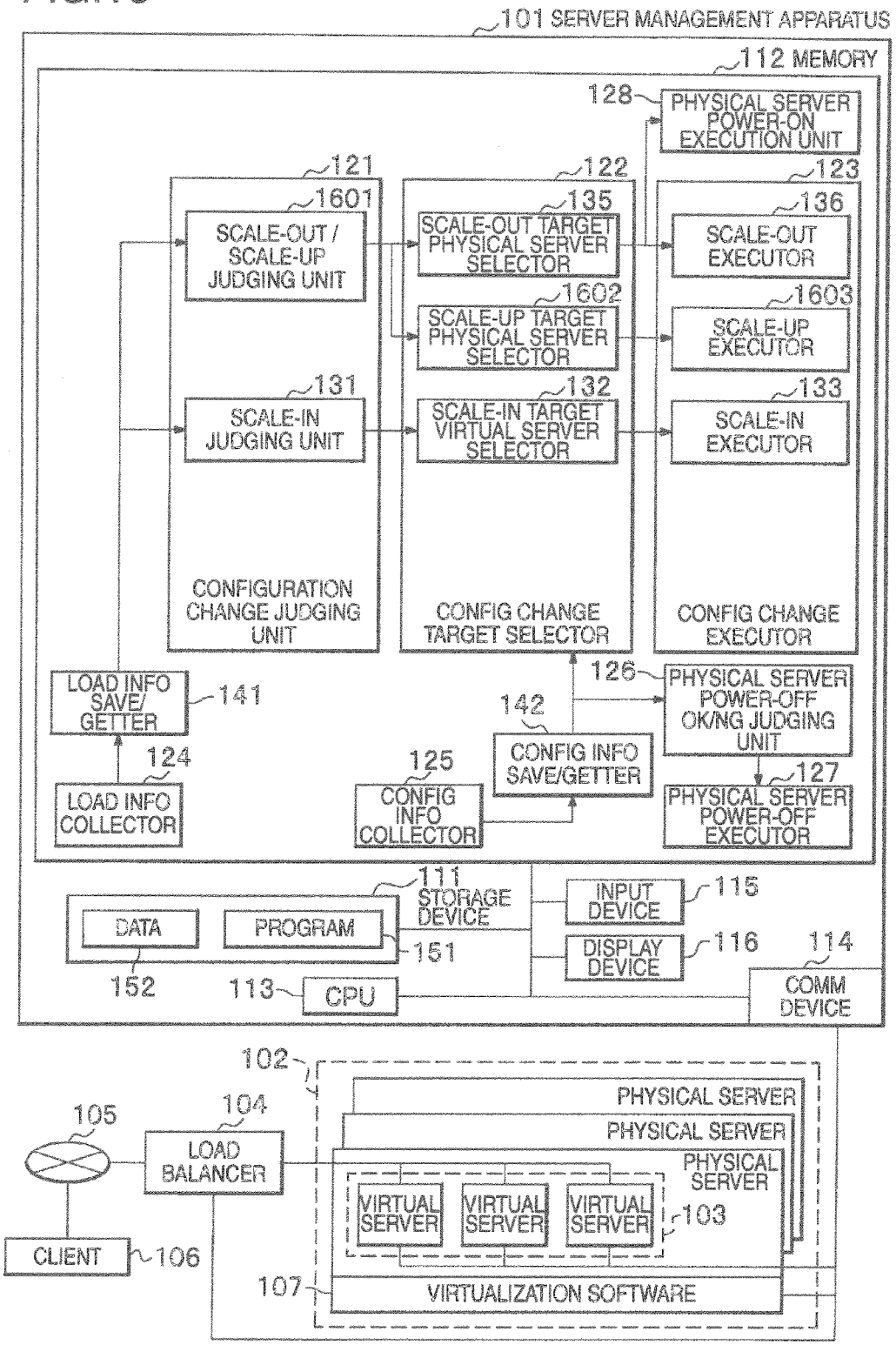
FIG. 16 is a diagram showing a cluster system, in accordance with an embodiment 5.

FIG. 16 is a diagram showing a cluster system in accordance with the embodiment 5. As shown in FIG. 16, respective software programs of a scale-up target virtual server selection unit 1602 and scale-up execution unit 1603 are added to the storage device 111 of the server management apparatus 101 of FIG. 1. Further, in order to judge which one of the scale-out and scale-up is executed, the scale-out judgment unit 134 is replaced by a scale-out/scale-up judgment unit 1601. Note here that the means for delaying the scale-out timing by applying scale-up to a cluster system-constituting virtual server(s) may also be added to the server management apparatus 101 of any one of the embodiments 2-4 stated supra. A detailed explanation of the processing of judging whether the scale-up is executable or not and executing the scale-up will be given with reference to a flow diagram of FIG. 17.

Figure 17:
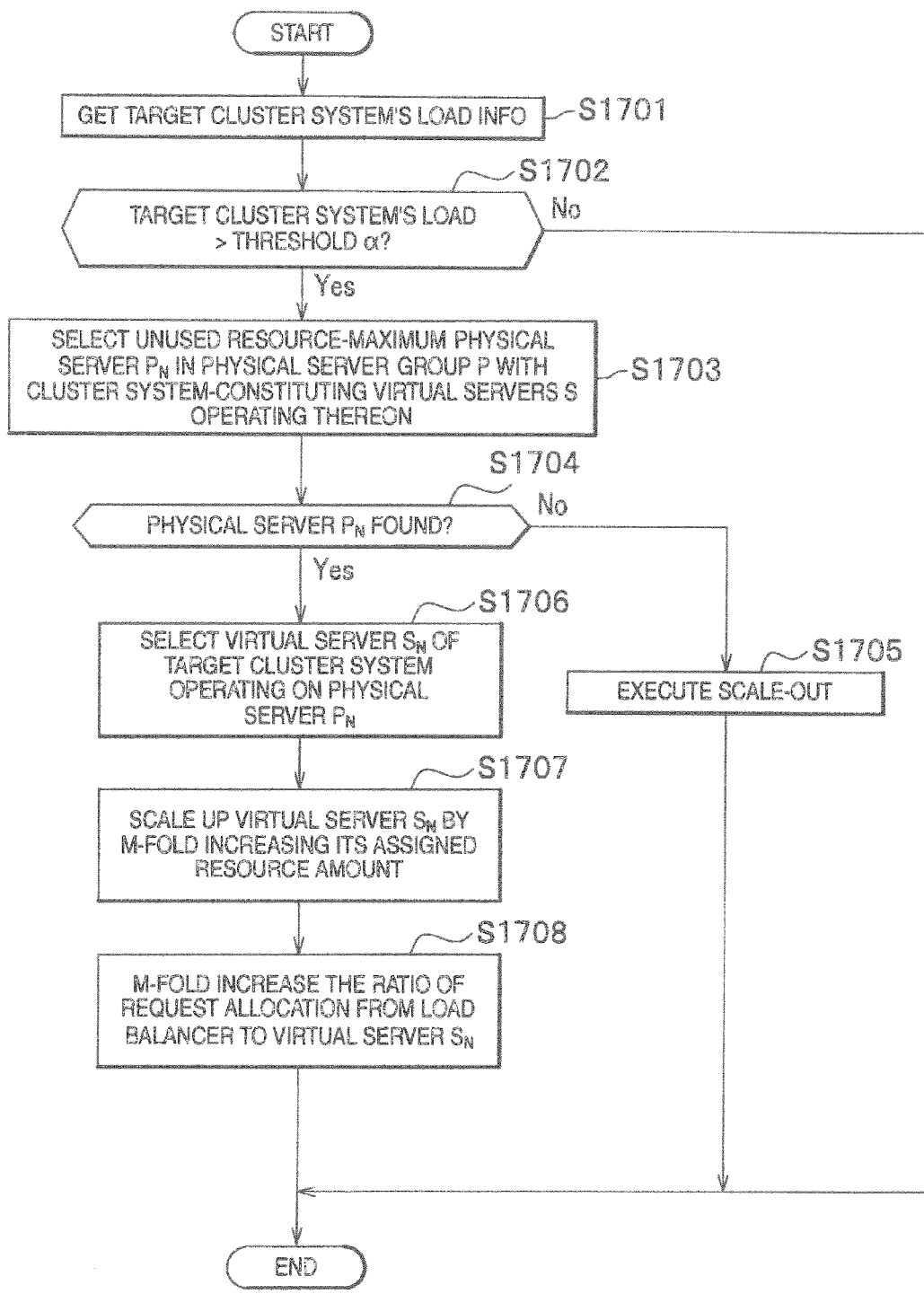
FIG. 17 is a diagram showing a flow of scale-up judgment and execution processing.

FIG. 17 is a diagram showing a flow of the scale-up judgment and execution processing. Reference is also made to FIG. 16 if necessary. In the scale-out/scale-up judgment unit 1601, the load information save/acquisition unit 141 acquires the load information from the storage device 111 (at step S1701). Then, it is determined whether the cluster system's load thus obtained is in excess of a preset threshold value a (step S1702). In case the cluster system load exceeds the threshold or (i.e., "Yes" at step S1702), it is judged that the scale-out/scale-up processing is needed; then, proceed to step S1703. If the cluster system load does not exceed the threshold a ("No" at step S1702), it is judged that the scale-out/scale-up is unnecessary; then, quit the processing.

The scale-up target virtual server selection unit 1602 selects a physical server $P_N$ with the largest unused computing (physical) resource amount from a physical server group P on which load-increased cluster system-constituting virtual servers are in operation (at step S1703). Then, it is determined whether a physical server $P_N$ having unused computing resources is present or absent (step S1704). If such physical server $P_N$ having unused computing resources does not exist (No at step S1704), scale-out processing is executed with respect to a load rise-up (step S1705); then, quit the processing.

If the physical server $P_N$ exists (Yes at step S1704), the scale-up target virtual server selection unit 1602 selects a virtual server $S_N$ of the target cluster system, which operates on the physical server $P_N$ (step S1706). Then, the scale-up execution unit 1603 increases a computing resource amount assigned to the virtual server $S_N$ so that it becomes M times greater than ever before and applies the scale-up thereto (step S1707). Thereafter, let an amount of request allocation from the load balancer 104 to virtual server $S_N$ increase M-fold (step S1708).

By the scale-up processing stated above, it is possible by using unused computing resources to delay the scale-out execution timing. As a result, it is possible to lengthen the power turn-off time of a physical server which becomes the target to be next applied the scale-out, thereby to enhance the power consumption reduction effect.

For demonstration of practical effects, one exemplary case is considered, wherein the cluster system's workload becomes higher within a fixed length of time period T and then goes down again. Within this period T, it was possible by scale-up to obtain the intended result without having to newly power on any physical server. A power reduction amount in this case is given as follows:

(power consumed for physical server's power-up and power-down)+$T$×(physical server's power consumption−power consumption increased by scale-up).

Here, the power consumption increased by scale-up is sufficiently less than the physical server's power consumption; so, the intended power consumption reducing effect is obtained. Even in cases where the scale-out takes place at time Ta after having executed the scale-up, the following power amount can be reduced:

$Ta$×(physical server's power consumption−power consumption increased by scale-up).

It should be noted that in this embodiment, the configuration information collection unit 125 collects as the configuration information the physical server's having unused computing resource amount. The scale-out/scale-up judgment unit 1601 of configuration change judgment unit 121 uses the obtained unused computing resource to judge whether the virtual server's scale-up is executable or not. When the above-noted judgment indicates that the scale-up is executable, the scale-up target virtual server selection unit 1602 of configuration change target selection unit 122 applies scale-up to the virtual server in place of the scale-out of cluster system. The scale-up execution unit 1603 of configuration change execution unit 123 manages the load balancer 104 which allocates a request from the client 106 to the virtual server group 103 constituting the cluster system and controls the load balancer 104 whereby it is possible to increase the amount of request allocation to the scaleup-executed virtual server to an extent larger than other virtual servers within the cluster system.

Embodiment 6

An embodiment 6 is the one that adds to the server management apparatus 101 of first embodiment a means for enabling the threshold for use by the configuration change judgment unit 121 to be variable or "adjustable" based on the operation policy of a cluster system. Additionally, in the configuration change target selection unit 122, a target object to be modified in configuration is selectable based on the cluster system operation policy.

Figure 18:
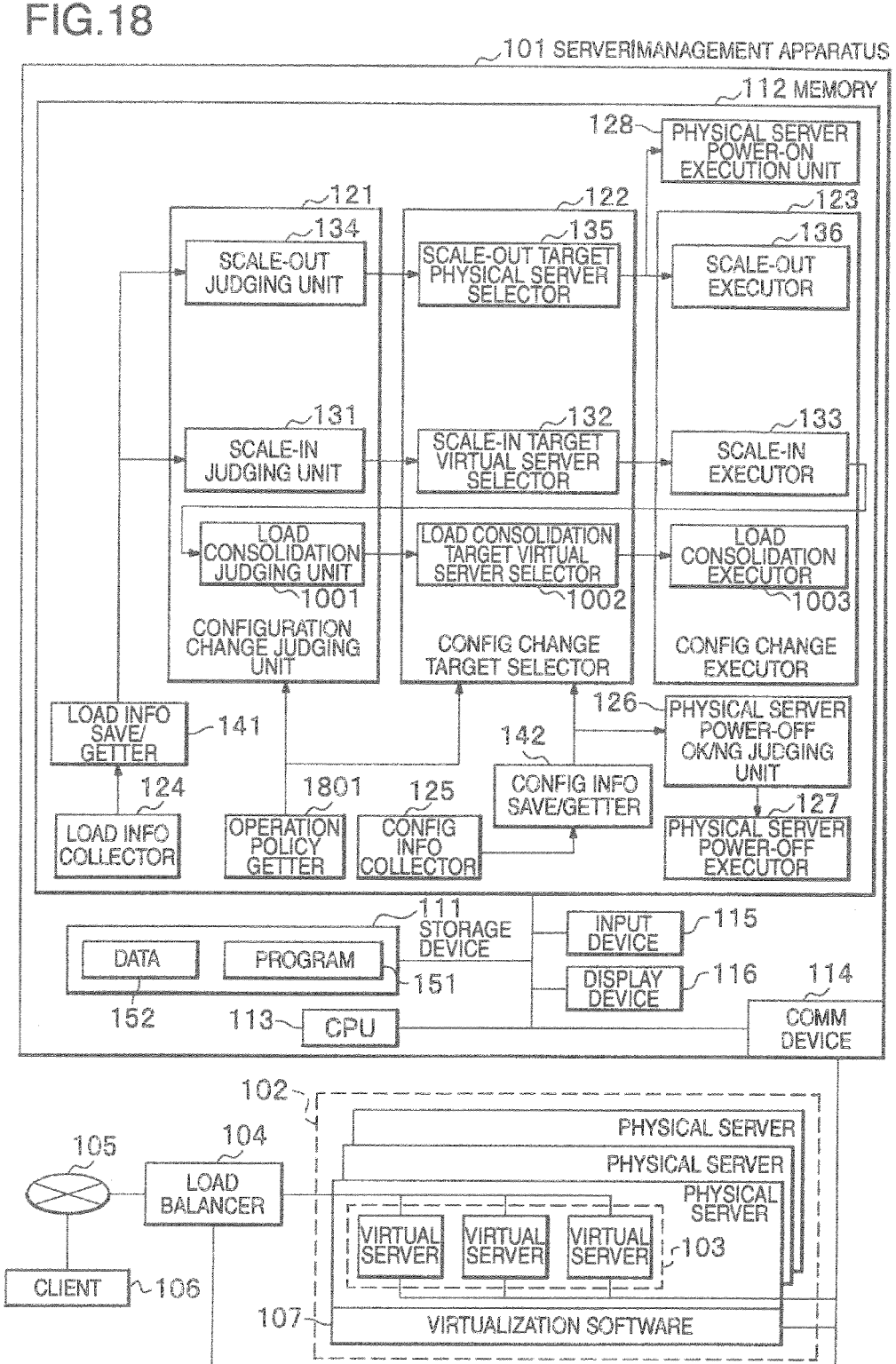
FIG. 18 is a diagram showing a cluster system in accordance with an embodiment 6.

FIG. 18 is a diagram showing a cluster system in accordance with the embodiment 6. As shown in FIG. 18, a software program of an operation policy acquisition unit 1801 is added to the storage device 111 of the server management apparatus 101 of FIG. 1. Note that the means for enabling the threshold for use by the configuration change judgment unit 121 to vary based on the operation policy of a cluster system may be added to the server management apparatus 101 of any one of the embodiments 2-5.

FIG. 19 is a diagram showing an example of the operation policy. A policy kind is written in judgment criterion #0, thereby defining an operation policy such as shown in an operation policy table 1901. Examples of it are "Active Power Save" and "Usability Keep." The "Active Power Save" is a policy of increasing the usage rate of a computing resource to thereby reduce surplus computing resources. The "Usability Keep" is a policy of giving a margin to the computing resource to be assigned to a virtual server to thereby enhance the fault tolerance and further support unexpected or "accidental" rise-up of workload. The operation policy table 1901 is held as one part of the data 152 in the storage device 111.

In the "Active Power Save" policy, the threshold values indicated in judgment criteria #3 to #8 are set so that these are higher than those for the "Usability Keep" policy to ensure that scale—in occurs more easily. A condition "or" which is indicated in judgment criterion #2 means that the scale-in/scale-out is executed when at least one of the judgment criteria #3-#8 is satisfied. On the other hand, a condition "and" indicated in the judgment criterion #2 means that the scale-in/scale-out is executed only when all of the judgment criteria #3-#8 are met. In the "Active Power Save" event, the scale-in condition is set to "or" whereby the scale-in occurrence is accelerated.

A maximal virtual server number in judgment criterion #9 is the maximum value of the number of the virtual servers constituting a cluster system. By setting this numerical value, an upper limit of the scale-out is defined to ensure that a specific cluster system does not use up its computing resources. This value may be set to no limit.

Those virtual servers constituting a cluster system are arranged to operate at all times on a certain number of physical servers, which number is larger than the minimum physical server number of a judgment criterion #10. By setting the minimum physical server number, it is possible to continue the processing being executed in the cluster system without interruptions even when an operation failure occurs at a specific physical server. In addition, in the case of selecting a to-be-deactivated virtual server after having executed the scale-in, any virtual server which might not satisfy the condition of the minimum physical server number if selected is not selected as the deactivation target virtual server after execution of the scale-in processing. The same goes for the workload consolidation target section processing. By setup of this minimum physical server number, it is possible to employ this embodiment for cluster systems of the type taking account of the fault tolerance. It is noted that if the fault tolerance is not considered, this number may be set to zero.

A virtual server migration number of judgment criterion #11 is a value indicative of an upper limit of the number of virtual servers which are migrated together in a single event of workload consolidation processing. An increase in virtual server migration number would result in an increase in system configuration change time, which leads to the risk of a delay of the response to another system configuration change request and the risk of degradation of response performance with respect to a request from the client. The acceptable amount of such influence is set in this virtual server migration event.

Figure 20:
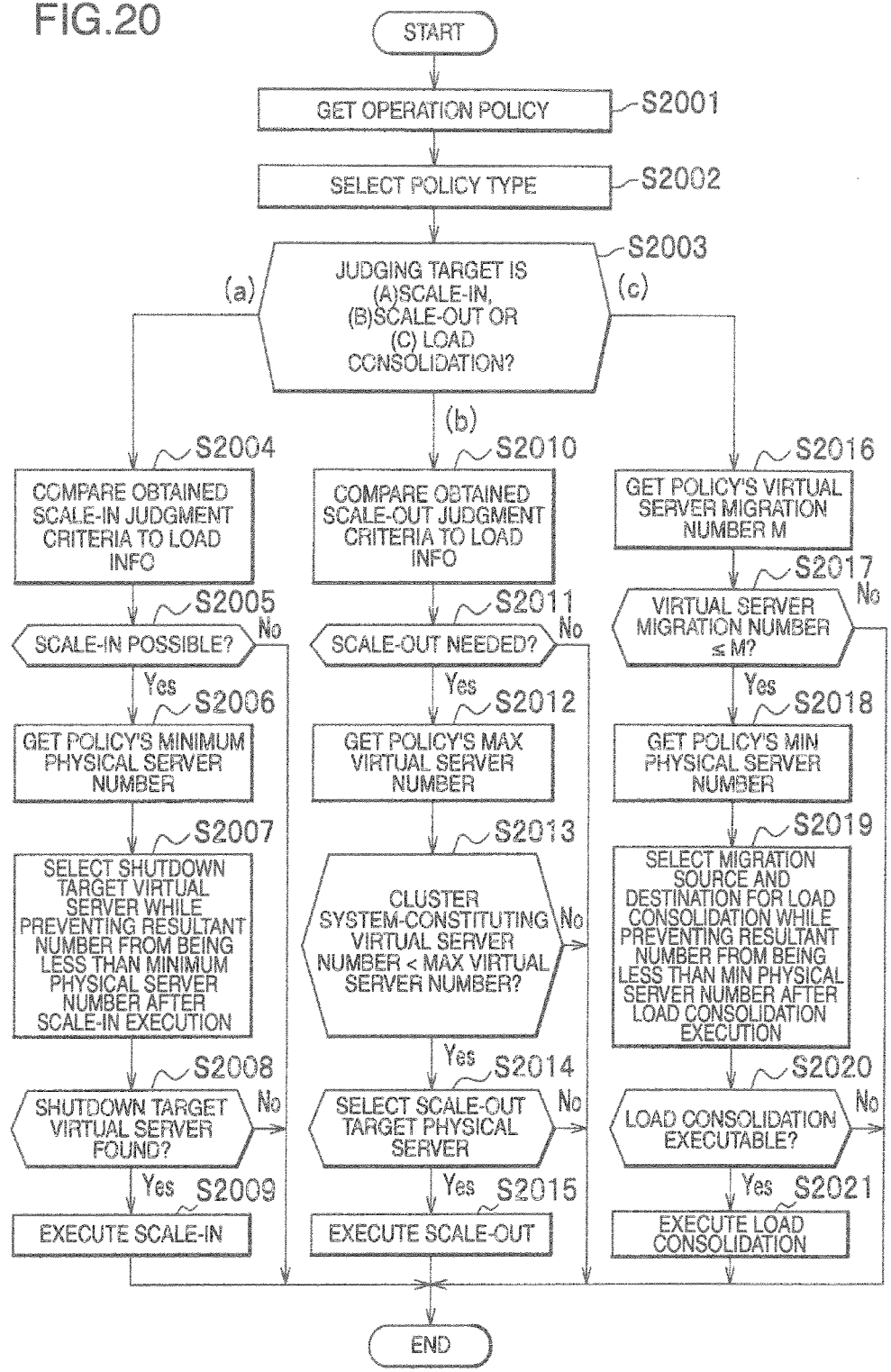
FIG. 20 is a diagram showing a flow of processing operations of a configuration change judgment unit, configuration change target selection unit and configuration change execution unit in the case of the operational policy being utilized.

FIG. 20 is a diagram showing a flow of processing operations of the configuration change judgment unit, configuration change target selection unit and configuration change execution unit in the case of the operational policy being utilized. Reference is also made to FIG. 18 when need arises. The flow of the processing of the configuration change judgment unit 121, configuration change target selection unit 122 and configuration change execution unit 123 in the case of using the operation policy will be explained with reference to FIG. 20.

The configuration change judgment unit 121 and configuration change target selection unit 122 acquire the operation policy table 1901 (see FIG. 19) from the operation policy acquisition unit 1801 (at step S2001), and select the policy kind from the acquired operation policy table 1901 (step S2002). This policy kind selection may be achieved by pre-selection from the input device 115 through the communication device 114 in case the system administrator of the server management apparatus 101 establishes a cluster system. The policy kind may be modifiable from input device via communication device 114 at any time during execution of the cluster system.

Next, the configuration change judgment unit 121 performs case-sensitive categorization in order to perform different processing operations for (a) scale-in, (b) scale-out and (c) workload consolidation of a configuration change judgment target (at step S2003).

In the case of (a) scale-in, firstly, the scale-in judgment unit 131 acquires a threshold value that is written in a row of judgment criteria of operation policy table 1901 and a column of scale-in of this table and then compares it to the load information as obtained from storage device 111 by the load information save/acquisition unit 141 (step S2005). When a result of this comparison indicates that the scale-in is not executable (i.e., if "No" at step S2005), quit the processing. If the scale-in is executable ("Yes" at step S2005) then acquire the minimum physical server number that is recited in the scale-in column of the operation policy table (step S2006). Next, the scale-in target virtual server selection unit 132 selects, after execution of the scale-in, a target virtual server with scale-in applied thereto (i.e., deactivation target) in such a manner that the number of physical servers on which cluster system-constituting virtual servers are rendered operative does not become less than the minimum physical server number (step S2007). Finally, if such scale-in target virtual server is found by the processing at step S2007 (Yes at step S2008), the scale-in execution unit 133 executes the scale-in (step S2008), followed by halting the processing. If the scale-in target virtual server is not found by the processing at step S2007 (No at step S2008), then quit the processing.

In this embodiment, the minimum physical server number is defined; thus, it is possible to distribute the cluster system-constituting virtual servers across a plurality of physical servers and allow them to operate thereon in order to enhance the cluster system's tolerance against physical server faults. In addition, at step S2008, the virtual server which can decrease in physical server fault tolerance if deactivated after execution of the scale-in may be excluded from those virtual servers to be deactivated after the scale-in execution.

In the case of (b) scale-out, first of all, the scale-out judgment unit 134 acquires a threshold value written in a row of judgment criteria of the operation policy table 1901 and a column of scale-out of this table, and then compares it to the load information that was obtained by the load information save/acquisition unit 141 from storage device 111 (step S2010). When a result of this comparison indicates that the scale-out is unnecessary (i.e., if No at step S2011), then quit the processing. If the scale-out is needed (Yes at step S2011) then acquire the maximum virtual server number that is written in the scale-out column of the operation policy (step S2012). Next, the scale-out target physical server selection unit 135 determines whether the number of cluster system-constituting virtual servers is less than the maximum virtual server number (step S2013). If the number of cluster system-constituting virtual servers is less than the maximum virtual server number (Yes at step S2013) then perform selection of a physical server to be regarded as the scale-out target (step S2014) and execute the scale-out processing (step S2015), followed by quitting the processing. If the number of cluster system-constituting virtual servers is not less than the maximum virtual server number (No at step S2013) then quit the processing.

In the case of (c) workload consolidation, firstly, the workload consolidation judgment unit 1001 acquires the virtual server migration number M which is written in the workload consolidation column of the operation policy table 1901 (at step S2016). This judgment unit 1001 determines whether the virtual server migration number needed for execution of the workload consolidation is less than or equal to M (step S2017). If the judgment is negative (No at step S2017), then quit the processing. If the judgment is affirmative (Yes at step S2017), then the workload consolidation selection unit 1002 obtains the minimum physical server number as recited in the workload consolidation column of the operation policy table 1901 (step S2018). After having executed the workload consolidation, certain virtual servers are selected, which become migration targets (i.e., a migration source and a migration destination) at the time of workload consolidation while ensuring that the number of physical servers on which are operated the virtual servers constituting the cluster system does not become less than the minimum physical server number (step S2019). By this selection, the migration target virtual servers are determined (selected) (step S2019). If the workload consolidation is executable (Yes at step S2020), the workload consolidation execution unit 1003 executes the workload consolidation (step S2021), followed by quitting the processing. If the workload consolidation is not executable (No step S2020) then exit the processing.

By using this embodiment for a system of the type which dynamically modifies system configurations to thereby optimize the computing resource amount, it is possible to reduce the number of virtual server migration events needed for execution of the workload consolidation and thus enhance the power consumption reducing effect. Furthermore, changing the scale-in execution timing makes it possible to prevent unwanted increase in power consumption otherwise occurring due to repeated execution of the scale-in and scale-out. In addition, by delaying the scale-out execution timing, it becomes possible to lengthen the power-off time of a physical server which becomes the scale-out target to thereby enhance the power consumption reduction effect.

Owing to execution of the scale-in of this embodiment, it is possible to permit getting close to the state after execution of the workload consolidation, such as a physical server which is greater in number of operating virtual servers thereon and a physical server that is less in number of operating virtual servers. Further, by continuing the scale-in, it is possible to realize the workload consolidated state without performing virtual server migration operations. Additionally, in this invention, the process of selecting a physical server on which a virtual server(s) is/are newly rendered operative is also performed prior to execution of scale-out in order to attain efficient approximation to the workload consolidation-executed state by the scale-m execution.

By the scale-out of this embodiment, those virtual servers which constitute workload variation-resembled cluster systems are consolidated to the same physical server. Accordingly, as for the time period in which the load of a specific cluster system falls down, those virtual servers to be deactivated after execution of the scale-in are gathered together onto a specific physical server.

By executing the scale-in/scale-out in the way stated above, the in-operation virtual servers are positionally "biased" in location between respective physical servers to thereby achieve approximation to the state after the workload consolidation execution. This makes it possible to reduce the virtual server migration number in workload consolidation events, when compared to a state that is less in bias of in-operation virtual servers between respective physical servers without using this invention.

Further, by modifying the scale-in execution timing, it is possible to prevent increase of power consumption otherwise occurring due to repeated execution of scale-in and scale-out. In addition, by delaying the scale-out execution timing, it is possible to lengthen the power turn-off time of a physical server that becomes the activation target prior to execution of scale-out, thereby enhancing the power consumption reducing effect.

The server management apparatus 101 of this embodiment manages the physical server group 102 which renders the virtual server group 103 operative thereon and also manages, when using and operating a cluster system containing therein a plurality of virtual servers that are disposed on the physical server group 102, the virtual server layout state in a way pursuant to a workload state of the virtual server group 103. At the time of scale-in execution, a virtual server operating on a physical server which is least in number of in-operation virtual servers is specified as the deactivation target. During scale-out execution, a load variation is predicted, and a cluster system's scale-out destination is controlled so that those cluster systems which are similar in load variation to each other are gathered onto the same physical server. The scale-in execution timing is appropriately adjustable in a way which follows; if the predicted load variation is on an upward trend, delay the execution; if it is on a downward trend then accelerate the execution.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A server management apparatus for managing a physical server group including physical servers rendering operative thereon a virtual server group having a plurality of virtual servers and for managing, when putting into practice a cluster system containing therein said plurality of virtual servers placed in said physical server group, a placement state of said virtual servers depending on a load state of said virtual server group, wherein said server management apparatus comprises:
   one or more computers configured with the following components:
   a load information collection unit which collects load information of the virtual server group constituting said cluster system;
   a configuration information collection unit which collects configuration information indicating that said virtual server group is presently assigned to which one of said physical servers;
   a configuration change judgment unit which determines from the collected load information whether the virtual servers constituting said cluster system are reducible in number;
   a configuration change target selection unit which selects from the collected configuration information a physical server which is least in operative virtual server number; and
   a configuration change execution unit which deactivates a virtual server operating on the selected physical server;
   a physical server power supply control unit which determines whether a virtual server is absent with respect to said physical server as a result of configuration change performed by said configuration change execution unit and for executing, when it is judged that such virtual server is absent, power-off of the physical server;
   wherein said server management apparatus is configured so that after said configuration change execution unit has executed the scale-in, said configuration change judgment unit judges whether it is possible to power off the physical server by operative virtual server migration, said configuration change target selection unit migrates one or more than one virtual server between physical servers when it is judged that it is possible to power off the physical server, said configuration change execution unit judges whether there is a virtual server operating on a physical server of migration source, and said physical server power supply control unit performs power-off of the physical server if the virtual server presence judgment indicates that no operative virtual servers exist therein.

2. The server management apparatus according to claim 1, wherein said server management apparatus further is configured to execute, prior to the deactivation of the virtual server specified as a deactivation target, scale-in processing for stopping request allocation to said virtual server of the deactivation target and for deleting it from the cluster system.

3. The server management apparatus according to claim 2, wherein said server management apparatus further comprises a load variation prediction unit which determines from the load information collected from said load information collection unit whether a load at a present time point is on an upward trend or on a downward trend with respect to each cluster system, and wherein said load variation prediction unit is configured to modify a threshold for use in scale-in execution possible/impossible judgment so that it becomes higher if the load is on the downward trend, and, if the load is on the upward trend, to modify the threshold for use in scale-in execution possible/impossible judgment so that it becomes lower in value.

4. The server management apparatus according to claim 3, wherein said load variation prediction unit further is configured to divide at predetermined time intervals data obtained by dividing per prespecified time period the load variation data based on said load information collected from said load information collection unit, to perform calculation to determine whether the load variation is on an upward trend or on a downward trend within such time period, and to judge a present state to be an unstable state if calculated numbers of the upward trend and the downward trend are both beyond a specified value.

5. The server management apparatus according to claim 3, wherein said load variation prediction unit is configured to apply weighted averaging to the load variation data based on the load information collected from said load information collection unit in such a way as to enlarge a load variation of nearer past and simultaneously lessen a load variation of farther past.

6. The server management apparatus according to claim 3, wherein said load variation prediction unit is configured to predict a load variation tendency from load information at a timing which is the same as a timing for execution of the prediction of load variation tendency.

7. The server management apparatus according to claim 2, wherein said server management apparatus stores in a storage device an operational policy including a minimal physical server number during the scale-in, said configuration change target selection unit is configured to select a virtual server to be deactivated in such a manner that its physical server number is not less than the minimal physical server number upon execution of the scale-in, and the scale-in of the virtual server to be deactivated is executed.

8. The server management apparatus according to claim 2, wherein said load information collection unit further collects a power consumption amount of the operative physical servers and stores it as said configuration information, and said configuration change target selection unit is configured to acquire from said configuration information a power consumption amount of a physical server on which the virtual server to be deactivated when the scale-in is performed is rendered operative, and determines a virtual server operating on a physical server which is greater in the acquired power consumption amount to be the virtual server that is deactivated when the scale-in is done.

9. The server management apparatus according to claim 1, wherein said server management apparatus is further configured so that;

said configuration change judgment unit determines from said collected load information whether the number of virtual servers constituting the cluster system is excessive or deficient;

when it is judged that the number of virtual servers constituting said cluster system is deficient, said configuration change target selection unit selects a physical server which is largest in operative virtual server number from the configuration information collected by said configuration information collection unit; and said configuration change execution unit activates a virtual server on the selected physical server.

10. The server management apparatus according to claim 9, wherein said server management apparatus further is configured to execute scale-out for adding the activated virtual server to said cluster system and for starting request allocation.

11. The server management apparatus according to claim 1, wherein said server management apparatus further comprises a load variation similarity calculation unit which derives from the load information which has been collected by said load information collection unit a degree of similarity of load variation between a plurality of cluster systems, and wherein said configuration change judgment unit is configured to judge from said collected load information whether scale-out for virtual server addition is necessary or not, when a result of the judgment indicates that the scale-out is necessary, said configuration change target selection unit is configured to select a physical server containing a larger number of virtual servers constituting a cluster system which is high in the derived degree of load variation similarity; and said configuration change execution unit determines the selected physical server to be a scale-out destination and then executes the scale-out.

12. The server management apparatus according to claim 11, wherein said configuration information collection unit further collects as said configuration information an amount of unused computing resources held by said physical server, said configuration change judgment unit is configured to judge based on the unused computing resource amount thus collected whether scale-up for increasing the computing resource amount to be assigned to virtual server is executable or not, said configuration change target selection unit is configured to apply scale-up to this virtual server when the judgment indicates that the scale-up is executable, and said configuration change execution unit is configured to manage a load dispersion device which allocates a request from a client to a virtual server group constituting the cluster system and controls said load dispersion device to thereby increase an amount of request allocation to the virtual server which has executed the scale-up to an extent greater than that of other virtual servers within the cluster system.

13. The server management apparatus according to claim 11, wherein said load variation similarity calculation unit is configured to acquire the load information collected from said load information collection unit in units of cluster systems and to determine those cluster systems which are identical to each other for a longer time in cluster system load increasing time period and in cluster system load decreasing time period to be cluster systems high in degree of similarity.

14. The server management apparatus according to claim 13, wherein said load variation similarity calculation unit is configured to acquire, in units of cluster systems, past load variation data based on the load information collected from said load information collection unit and an operative virtual server number at that time, and to determine cluster systems which are identical to each other for a longer time in the operative virtual server number of cluster system to be cluster systems high in similarity degree.

15. The server management apparatus according to claim 14, wherein said load variation similarity calculation unit is configured to determine cluster systems which are identical to each other in time period which is less in number of operative virtual servers of cluster system rather than in time period which is larger in number of operative virtual servers of cluster system to be higher in similarity degree.

16. The server management apparatus according to claim 14, wherein said load variation similarity calculation unit is configured to determine cluster systems which are identical to each other in the operative virtual server number in a time zone which is nearer to a judgment execution time point after this judgment execution time point.

17. The server management apparatus according to claim 14, wherein said load variation similarity calculation unit is configured to extract the similarity degree of a load variation from the load information at a timing being the same as a timing for execution of an extraction work.

18. The server management apparatus according to claim 14, wherein said load variation similarity calculation unit is configured to apply weighting to a number of virtual servers which have been rendered operative in the past of a prespecified time in such a way as to determine that the similarity degree of a load variation of nearer past is higher.

19. The server management apparatus according to claim 14, wherein said load variation similarity calculation unit is configured to determine cluster systems which are identical to each other in time period which is less in number of operative virtual servers of cluster system rather than in time period which is larger in number of operative virtual servers of cluster system to be higher in similarity degree.

20. The server management apparatus according to claim 14, wherein said load variation similarity calculation unit is configured to determine cluster systems which are identical to each other in the operative virtual server number in a time zone which is nearer to a judgment execution time point after this judgment execution time point.

21. The server management apparatus according to claim 14, wherein said load variation similarity calculation unit is configured to extract the similarity degree of a load variation from the load information at a timing being the same as a timing for execution of an extraction work.

22. The server management apparatus according to claim 14, wherein said load variation similarity calculation unit is configured to apply weighting to a number of virtual servers which have been rendered operative in the past of a prespecified time in such a way as to determine that the similarity degree of a load variation of nearer past is higher.

23. The server management apparatus according to claim 13, wherein said load variation similarity calculation unit is configured to acquire, in units of cluster systems, past load variation data based on the load information collected from said load information collection unit and an operative virtual server number at that time, and to determine cluster systems which are identical to each other for a longer time in the operative virtual server number of cluster system to be cluster systems high in similarity degree.

24. The server management apparatus according to claim 1, wherein when migrating said one or more than one virtual server between physical servers, in activation/deactivation operations of the virtual server operating on a physical server of migration source which constitutes said cluster system and a virtual server which is in a halt state in a physical server of migration destination, said server management apparatus is configured to request the migration destination physical server to activate a virtual server of migration destination being set in the halt state in the migration destination physical server, to request a load dispersion device which allocates a request from a client to start request allocation to the migration destination virtual server, requests said load dispersion device to stop the request allocation to a virtual server of migration source, and to request the migration source physical server to shut down the migration source virtual server operating in said migration source physical server.

25. A server management apparatus for managing a physical server group including physical servers rendering operative thereon a virtual server group having a plurality of virtual servers and for managing, when putting into practice a cluster system containing therein said plurality of virtual servers placed in said physical server group, a placement state of said virtual servers depending on a load state of said virtual server group, wherein said server management apparatus comprises:

one or more computers configured with the following components:
a load information collection unit which collects load information of the virtual server group constituting said cluster system;
a configuration information collection unit which collects configuration information indicating that said virtual server group is presently assigned to which one of said physical servers;
a configuration change judgment unit which determines from the collected load information whether the virtual servers constituting said cluster system are reducible in number;
a configuration change target selection unit which selects from the collected configuration information a physical server which is least in operative virtual server number; and
a configuration change execution unit which deactivates a virtual server operating on the selected physical server;
a load variation similarity calculation unit which derives from the load information which has been collected by said load information collection unit a degree of similarity of load variation between a plurality of cluster systems,
wherein said configuration change judgment unit is configured to judge from said collected load information whether scale-out for virtual server addition is necessary or not, wherein the configuration change target selection unit is configured so that when a result of the judgment indicates that the scale-out is necessary, said configuration change target selection unit selects a physical server containing a larger number of virtual servers constituting a cluster system which is high in the derived degree of load variation similarity; and said configuration change execution unit determines the selected physical server to be a scale-out destination and then executes the scale-out, wherein said load information collection unit is configured to collect, when said physical server is registered to said server management apparatus, the configuration information containing therein the computing resource amount and registers it to a storage device, said configuration change judgment unit is configured to acquire, at a time of scale-out target judgment, the computing resource amount of a physical server under suspension and determines a scale-out destination while letting the physical server under suspension be included therein, said configuration change target selection unit is configured such that said server management apparatus activates the physical server under suspension when the server under suspension is specified as the scale-out destination by the judgment, and said configuration change execution unit is configured to activate a virtual server on the activated physical server to thereby perform the scale-out.

26. The server management apparatus according to claim 25, wherein said server management apparatus is configured to further execute, prior to the deactivation of the virtual server specified as a deactivation target, scale-in processing for stopping request allocation to said virtual server of the deactivation target and for deleting it from the cluster system.

27. The server management apparatus according to claim 26, wherein said server management apparatus further comprises a load variation prediction unit which determines from the load information collected from said load information collection unit whether a load at a present time point is on an upward trend or on a downward trend with respect to each cluster system, and wherein said load variation prediction unit is configured to modify a threshold for use in scale-in execution possible/impossible judgment so that it becomes higher if the load is on the downward trend, and, if the load is on the upward trend, modifies the threshold for use in scale-in execution possible/impossible judgment so that it becomes lower in value.

28. The server management apparatus according to claim 27, wherein said load variation prediction unit is further configured to divide at predetermined time intervals data obtained by dividing per prespecified time period the load variation data based on said load information collected from said load information collection unit, to perform calculation to determine whether the load variation is on an upward trend or on a downward trend within such time period, and to judge a present state to be an unstable state if calculated numbers of the upward trend and the downward trend are both beyond a specified value.

29. The server management apparatus according to claim 27, wherein said load variation prediction unit is configured to apply weighted averaging to the load variation data based on the load information collected from said load information collection unit in such a way as to enlarge a load variation of nearer past and simultaneously lessen a load variation of farther past.

30. The server management apparatus according to claim 27, wherein said load variation prediction unit is configured to predict a load variation tendency from load information at a timing which is the same as a timing for execution of the prediction of load variation tendency.

31. The server management apparatus according to claim 26, wherein said server management apparatus stores in a storage device an operational policy including a minimal physical server number during the scale-in, said configuration change target selection unit is configured to select a virtual server to be deactivated in such a manner that its physical server number is not less than the minimal physical server number upon execution of the scale-in, and the scale-in of the virtual server to be deactivated is executed.

32. The server management apparatus according to claim 26, wherein said load information collection unit is further configured to collect a power consumption amount of the operative physical servers and to store it as said configuration information, and said configuration change target selection unit is configured to acquire from said configuration information a power consumption amount of a physical server on which the virtual server to be deactivated when the scale-in is performed is rendered operative, and determines a virtual server operating on a physical server which is greater in the acquired power consumption amount to be the virtual server that is deactivated when the scale-in is done.

33. The server management apparatus according to claim 25, wherein said server management apparatus is further arranged so that;

said configuration change judgment unit is configured to determine from said collected load information whether the number of virtual servers constituting the cluster system is excessive or deficient;

when it is judged that the number of virtual servers constituting said cluster system is deficient, said configuration change target selection unit is configured to select a physical server which is largest in operative virtual server number from the configuration information collected by said configuration information collection unit; and said configuration change execution unit is configured to activate a virtual server on the selected physical server.

34. The server management apparatus according to claim 33, wherein said server management apparatus further is configured to execute scale-out for adding the activated virtual server to said cluster system and for starting request allocation.

35. The server management apparatus according to claim 25, wherein said server management apparatus further comprises:

a physical server power supply control unit which determines whether a virtual server is absent with respect to said physical server as a result of configuration change performed by said configuration change execution unit and for executing, when it is judged that such virtual server is absent, power-off of the physical server.

36. The server management apparatus according to claim 35, wherein the server management apparatus is configured so that after said configuration change execution unit has executed the scale-in, said configuration change judgment unit judges whether it is possible to power off the physical server by operative virtual server migration, said configuration change target selection unit migrates one or more than one virtual server between physical servers when it is judged that it is possible to power off the physical server, said configuration change execution unit judges whether there is a virtual server operating on a physical server of migration source, and said physical server power supply control unit performs power-off of the physical server if the virtual server presence judgment indicates that no operative virtual servers exist therein.

37. The server management apparatus according to claim 25, wherein said configuration information collection unit is configured to further collect as said configuration information an amount of unused computing resources held by said physical server, said configuration change judgment unit judges based on the unused computing resource amount thus collected whether scale-up for increasing the computing resource amount to be assigned to virtual server is executable or not, said configuration change target selection unit is configured to apply scale-up to this virtual server when the judgment indicates that the scale-up is executable, and said configuration change execution unit manages a load dispersion device which allocates a request from a client to a virtual server group constituting the cluster system and controls said load dispersion device to thereby increase an amount of request allocation to the virtual server which has executed the scale-up to an extent greater than that of other virtual servers within the cluster system.

38. The server management apparatus according to claim 25, wherein when migrating said one or more than one virtual server between physical servers, in activation/deactivation operations of the virtual server operating on a physical server of migration source which constitutes said cluster system and a virtual server which is in a halt state in a physical server of migration destination, server management apparatus is configured to request the migration destination physical server to activate a virtual server of migration destination being set in the halt state in the migration destination physical server, requests a load dispersion device which allocates a request from a client to start request allocation to the migration destination virtual server, to request said load dispersion device to stop the request allocation to a virtual server of migration source, and to request the migration source physical server to shut down the migration source virtual server operating in said migration source physical server.

39. The server management apparatus according to claim 25, wherein said load variation similarity calculation unit is configured to acquire the load information collected from said load information collection unit in units of cluster systems and determines those cluster systems which are identical to each other for a longer time in cluster system load increasing time period and in cluster system load decreasing time period to be cluster systems high in degree of similarity.

40. A server management method for use in a server management apparatus operative to manage a physical server group including physical servers for rendering operative thereon a virtual server group having a plurality of virtual servers, said method being for managing a placement state of the virtual servers depending on a load state of said virtual server group when handling for practical use a cluster system containing therein said plurality of virtual servers placed in said physical server group, said method comprising the steps of:

collecting load information of the virtual server group constituting said cluster system;

collecting configuration information indicating that said virtual server group is currently assigned to which one of said physical servers;

determining from the collected load information whether scale-in processing for deactivating a virtual server is executable or not;

selecting from the collected configuration information a physical server which is least in number of operative virtual servers;

selecting a virtual server operating on the selected physical server as a target to be deactivated after execution of the scale-in and then executes the scale-in;

deriving from the load information collected in past times a degree of similarity of a load variation between a plurality of cluster systems;

judging from the collected load information whether the scale-out for virtual server addition is needed or not;

when the judgment indicates that the scale-out is needed, selecting a physical server on which a larger number of virtual servers constituting a cluster system being high in the derived load variation similarity exist thereon; and determining the selected physical server to be a scale-out destination to thereby execute the scale-out.

41. The server management method according to claim 40, wherein said server management apparatus further performs operations including; determining from said collected load information whether scale-out processing for adding a virtual server is needed or not, when a result of the determination indicates that the scale-in is needed, selecting from said collected configuration information a physical server which is largest in number of operative virtual servers, and activating a virtual server on the selected physical server to thereby execute the scale-out.

* * * * *